(12) United States Patent
Keegan et al.

(10) Patent No.: US 7,453,925 B2
(45) Date of Patent: Nov. 18, 2008

(54) PHASE MULTI-PATH MITIGATION

(75) Inventors: Richard Gerald Keegan, Palos Verdes Estates, CA (US); Eugene Jerry Knight, Long Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 761 days.

(21) Appl. No.: 10/968,632

(22) Filed: Oct. 18, 2004

(65) Prior Publication Data

US 2006/0083293 A1    Apr. 20, 2006

(51) Int. Cl.
*H04B 1/00* (2006.01)

(52) U.S. Cl. .................... 375/148; 375/149; 375/354; 375/371

(58) Field of Classification Search .............. 367/38, 367/43; 375/130, 140, 147–153, 316, 322, 375/324, 328, 377, 148–149, 354, 371; 342/357.06
See application file for complete search history.

(56) References Cited

U.S. PATENT DOCUMENTS

| | | | |
|---|---|---|---|
| 5,923,703 A | 7/1999 | Pon et al. ............... 375/209 |
| 6,031,881 A | 2/2000 | Weill et al. | |
| 6,160,841 A * | 12/2000 | Stansell et al. ........... 375/148 |
| 6,370,207 B1 | 4/2002 | Weill et al. | |
| 6,744,404 B1 | 6/2004 | Whitehead et al. ..... 342/357.12 |
| 7,253,769 B2 * | 8/2007 | Leblond ................ 342/378 |

2002/0142782 A1 * 10/2002 Berliner et al. ........... 455/456

FOREIGN PATENT DOCUMENTS

WO   WO 96/37789   11/1996

OTHER PUBLICATIONS

International Search Report for International Application No. PCT/US2005/034884, dated Feb. 27, 2006.
Betaille, D.,e t al., "A New Approach to GPS Phase Multipath Mitigation," Proceedings of ION NTM, Anaheim, CA, Jan. 24, 2003.

* cited by examiner

*Primary Examiner*—Shuwang Liu
*Assistant Examiner*—James M Perez
(74) *Attorney, Agent, or Firm*—Morgan, Lewis & Bockius LLP

(57) ABSTRACT

A system and method for mitigating a multi-path-induced error in a global navigation satellite system (GNSS) is described. In one embodiment of the method, a composite signal is received. The composite signal includes a band-limited direct-path signal and at least one band-limited multi-path signal that are each modulated with periodic phase reversals. The composite signal is measured as a function of time during a time interval having at least one of the periodic phase reversals. A phase error $\phi_\epsilon$ between the composite signal and the direct-path signal due to the multi-path signal is determined using the measured composite signal as a function of time and a pre-determined filter characteristic corresponding to a filter used to band limit the direct-path signal and the multi-path signal. The phase error $\phi_\epsilon$ in a navigation computation is corrected.

48 Claims, 15 Drawing Sheets

PHASE MULTI-PATH MITIGATION

FIELD OF THE INVENTION

The present invention relates generally to a global navigation satellite system (GNSS) and more specifically, to a system and method for mitigating a multi-path-induced error in a global navigation satellite system (GNSS).

BACKGROUND OF THE INVENTION

Receivers in global navigation satellite systems (GNSS), such as the Global Positioning System (GPS), use range measurements that are based on line-of-sight signals from satellites. The receiver measures the time-of-arrival of one or more broadcast signals. This time-of-arrival measurement includes a time measurement based upon a coarse acquisition coded portion of a signal, called pseudo-range, and a phase measurement based on an L-band carrier signal, including L1 at 1.57542 GHz, L2 at 1.22760 GHz and will soon include L5 at 1.17645 GHz. Ideally, these measurements are based only on the direct line-of-sight signals. The actual signals received by the receiver, however, are a composite of the direct line-of-sight signals and one or more secondary reflected signals. These secondary signals, known as multi-path signals, are reflected by any number of structures, including buildings, equipment and the ground.

FIG. 1 illustrates a composite signal in a global navigation satellite system (GNSS) 100. A device 110 receives a direct-path signal 114 and a single multi-path signal 116 reflected off of object 112. The path-length of the multi-path signal 116 is longer than that of the direct-path signal 114. As a consequence, the multi-path signal 116 is a slightly delayed replica of the direct-path signal 114 with typically a lower amplitude. FIG. 2 illustrates a phasor diagram 200 of the signals received by the device 110 (FIG. 1) including in-phase I 1212 and quadrature Q 210 components (relative to an internal reference in the device 110 in FIG. 1). The quadrature Q 210 component has a 90° phase relationship with the in-phase I 1212 component. The direct-path signal 114 (FIG. 1) has amplitude $A_d$ 214 and a phase $\theta_d$ 218. The multi-path signal 116 (FIG. 1) has amplitude $A_m$ 216 and phase $\theta_m$ 220. Since the multi-path signal 116 (FIG. 1) arrives at a different time than the direct-path signal 114 (FIG. 1), phases $\theta_d$ 218 and $\theta_m$ 220 are different.

Multi-path signals, such as the multi-path signal 116 (FIG. 1), give rise to a distortion in the L-band carrier signal also known as phase multi-path. FIG. 3 illustrates magnitude 310 as a function of time 312 for signals in phase multi-path distortion 300. A composite signal 314 received by the device 110 (FIG. 1) is the sum of a sinusoidal direct-path signal 316 and typically a lower-amplitude, delayed multi-path signal 318. The direct-path signal 316 and the multi-path signal 318 are encoded such that each undergoes a 180° phase reversal at a code chip edge. Note that the phase reversal is also known as a code transition. The code transition rate (also known as the code chip edge rate) is a sub-multiple of the L-Band Carrier Frequency. For example, in GPS the sub-multiple is 154 and 120 for the P-code on L1 and L2, respectively. The code chip rate is 1.023 MHz for the coarse acquisition code (or CA code). In many global navigation satellite systems (GNSS) signals are encoded with code transitions using a bi-phase modulation code where a carrier signal phase is advanced or retarded by 90°. The different phase of the multi-path signal 318 results in noticeable distortion in the composite signal 314 during time interval 320. There are, however, effects at other times, too. For example, in this illustration a zero crossing 324 of the composite signal 314 is delayed, i.e., shifted to the right, relative to a zero crossing 322 of the direct-path signal 316. In general, multi-path signals may result in zero crossings of the composite signal 314 that are delayed or advanced. This apparent phase advance or delay gives rise to a phase error.

There is a need for a technique to mitigate such a multi-path-induced error in global navigation satellite systems (GNSS).

SUMMARY OF THE INVENTION

A system and method for mitigating a multi-path-induced error in a global navigation satellite system (GNSS) is described. In one embodiment of the method, a composite signal is received. The composite signal includes a band-limited direct-path signal and at least one band-limited multi-path signal that are each modulated with periodic phase reversals. The composite signal is measured as a function of time during a time interval having at least one of the periodic phase reversals. A phase error $\phi_\epsilon$ between the composite signal and the direct-path signal due to the multi-path signal is determined in accordance with the measured composite signal as a function of time and a pre-determined filter characteristic corresponding to a filter used to band limit the direct-path signal and the multi-path signal. The phase error $\phi_{68}$ in a navigation computation is corrected.

In some embodiments of the method, the filter characteristic is a filter step response, a filter impulse response or a filter complex transfer function.

In some embodiments of the method, a time delay $\delta$ of the multi-path signal relative to the direct-path signal is substantially less than a filter step response time corresponding to the filter used to band limit the direct-path signal and the multi-path signal.

In some embodiments of the method, a time error $\Delta t$ corresponding to a difference between an actual phase reversal time including the effect of the multi-path signal and a phase reversal time without the effect of the multi-path signal is determined and a pseudo-range is corrected for an error corresponding to the time error $\Delta t$.

In an embodiment of the system, a device that mitigates the effect of a multi-path-induced error in a global navigation satellite system (GNSS) includes a receiver that receives a composite signal. The composite signal includes a band-limited direct-path signal and at least one band-limited multi-path signal that are each modulated with periodic phase reversals. The device further includes a measurement mechanism, which samples the composite signal as a function of time during a time interval having at least one of the periodic phase reversals, a processor and a memory. The memory includes at least one program module that is executed by the processor, the at least one program module contains instructions for determining a phase error $\phi_\epsilon$ between the composite signal and the direct-path signal due to the multi-path signal in accordance with the measured composite signal as a function of time and a pre-determined filter characteristic used to band limit the direct-path signal and the multi-path signal. The device is configured to correct for the phase error $\phi_\epsilon$ in a navigation computation.

In some embodiments of the system, the filter characteristic is a filter step response, a filter impulse response or a filter complex transfer function.

In some embodiments of the system, a time delay $\delta$ of the multi-path signal relative to the direct-path signal is substantially less than a filter step response time corresponding to the filter used to band limit the direct-path signal and the multi-path signal.

In some embodiments of the system, the at least one program module further contains instructions for determining a time error $\Delta t$, the time error $\Delta t$ corresponding to a difference between an actual phase reversal time including the effect of the multi-path signal and a phase reversal time without the effect of the multi-path signal, and correcting an error in a pseudo-range corresponding to the time error $\Delta t$.

Additional variations on the method and system embodiments are provided.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DETAILED DESCRIPTION OF THE DRAWINGS

Figure 3:
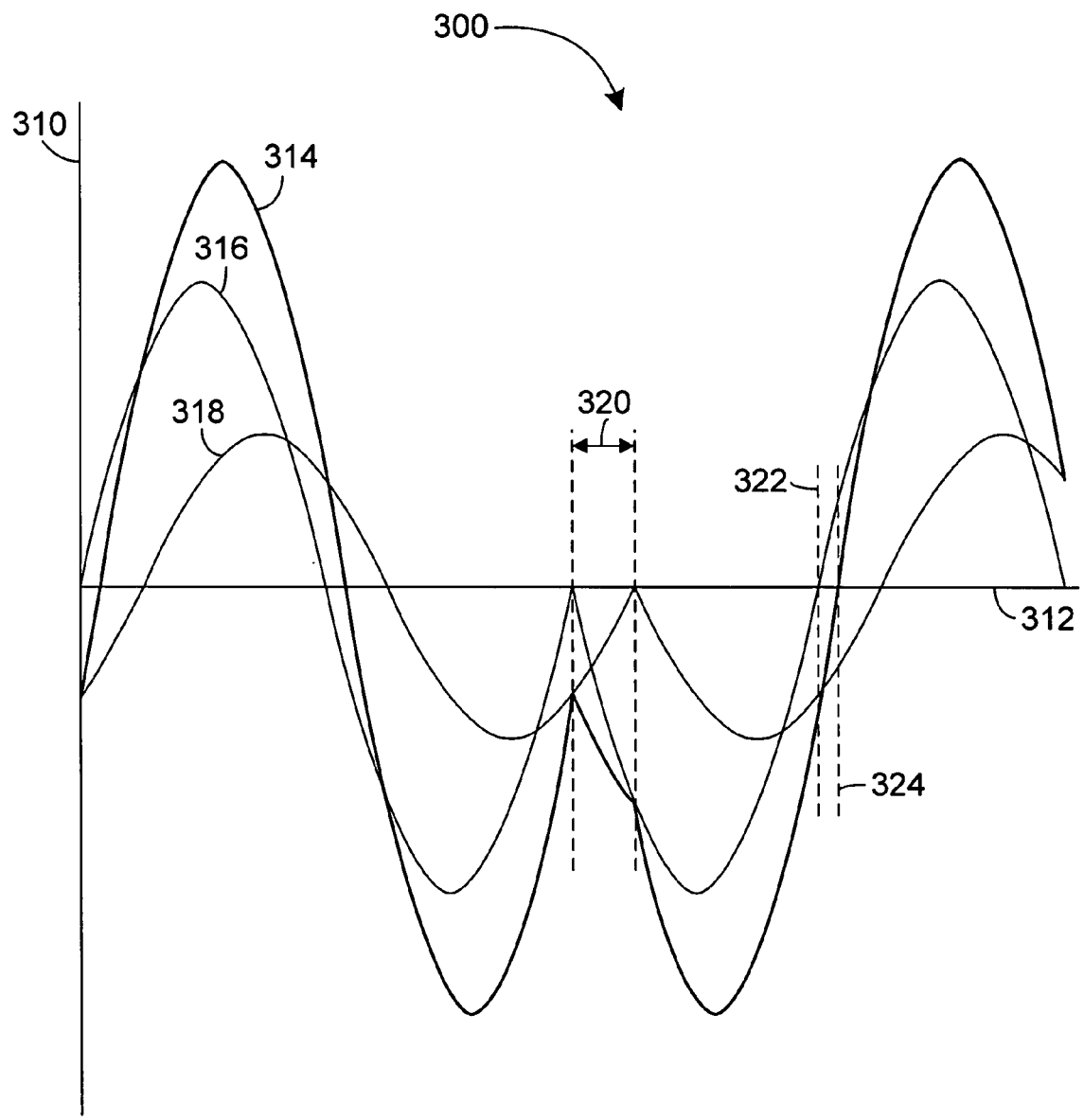
FIG. 3 illustrates phase multi-path distortion of a composite signal.

Referring to FIG. 3, the composite signal 314 has a complicated but predictable shape during the time interval 320 between the code chip edge for the direct-path signal 316 and the code chip edge for the multi-path signal 318. The observable characteristics of the received composite signal 314 during the time interval 320 are used in a system and method to determine and mitigate one or more multi-path-induced errors.

GPS is used to illustrate the system and method. The system and method are, however, not limited to GPS. They may be used in other global navigation satellite systems (GNSS) including but not limited to the Global Orbiting Navigation Satellite System (GLONASS), the GALILEO positioning system, the European Geostationary Navigation Overlay System (EGNOS), the Wide Area Augmentation System (WAAS), the Multifunctional Transport Satellite-Based Augmentation System (MSAS) and a Quasi-Zenith Satellite System (QZSS).

Figure 1:
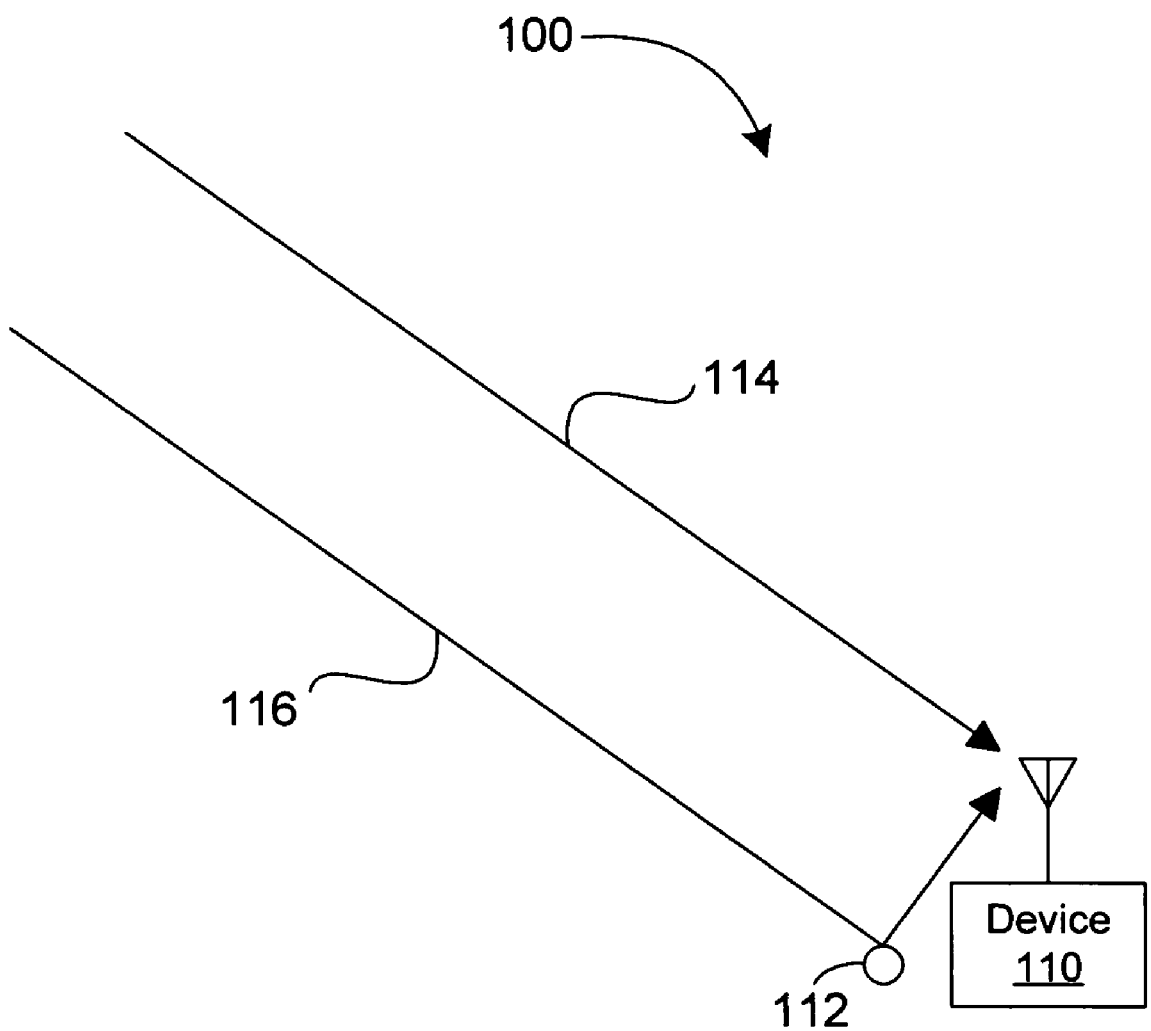
FIG. 1 is a diagram illustrating a global navigation satellite system (GNSS) with a direct-path signal and a multi-path signal.
Figure 4A:
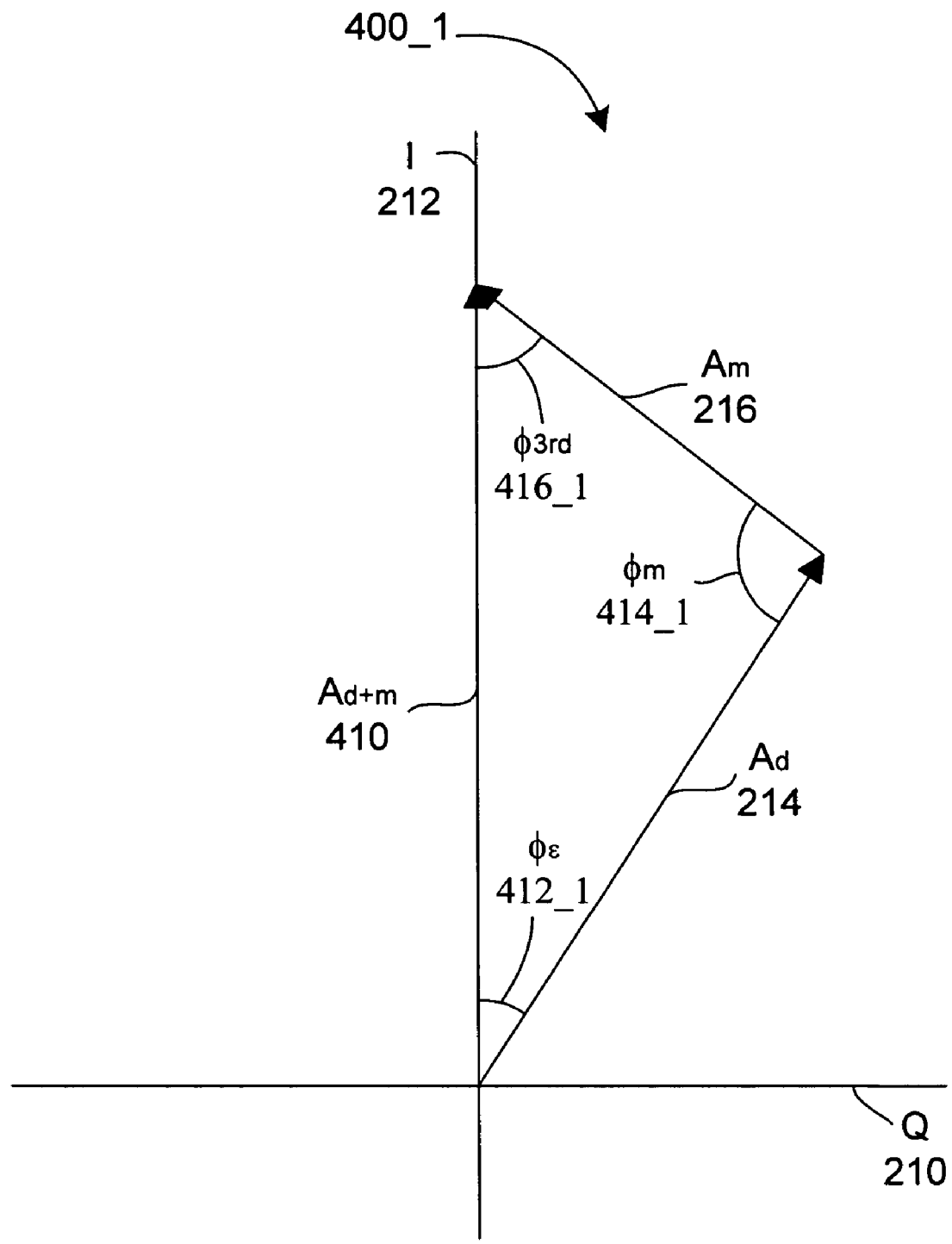
FIG. 4A illustrates a tracked vector in a device in the global navigation satellite system (GNSS).

In GPS, the L-band carrier signal is encoded using a spread-spectrum pseudo-random-noise code with a bi-phase modulation. The basic signal processing performed by the device 110 (FIG. 1) on the composite signal 314 is a tracking loop process that matches a phase of a replica signal created by the device 110 (FIG. 1) with a phase of the composite signal 314 received from at least one satellite. The synchronization used to create the replica signal provides the basic code pseudo-range measurement and the carrier phase measurement made by the device 110 (FIG. 1). The tracking process of the device 110 (FIG. 1) cannot easily distinguish between the direct-path signal 316 and the multi-path signal 318, so it tracks the composite signal 314. FIG. 4A is an illustration of the tracking loop process 400_1, where a tracked vector, the composite signal amplitude $A_{d+m}$ 410, is the vector sum of the direct-path signal amplitude 214 and the multi-path signal amplitude 216. The composite signal amplitude $A_{d+m}$ 410, and thus the signal replica used in the phase measurement, has a phase error $\phi_\epsilon$ 412_1 relative to the direct-path signal amplitude 214. FIG. 4A also illustrates the phase difference $\phi_m$ 414_1 between the direct-path signal amplitude 214 and the multi-path signal amplitude 216 and the phase $\phi_{3rd}$ 416_1, which is equal to 180 degrees (or equivalently, $\pi$ radians) minus the sum of $\phi_\epsilon$ 412_1 and $\phi_m$ 414_1. FIG. 4A corresponds to times prior to the time interval 320 (FIG. 3).

Referring to FIG. 3, the behavior of the composite carrier signal 314 during the time interval 320 when the code chip edge begins in the direct-path signal 316 and ends in the multi-path signal 318 is observable by the device 110 (FIG. 1). Since the multi-path signal 318 is delayed with respect to the direct-path signal 316, code transitions of the carrier signal corresponding to the code chip edge occur at a later time in the multi-path signal 318. A first approach to mitigating multi-path-induced errors, using this characteristic, is illustrated in FIGS. 4B and 4C.

Figure 4B:
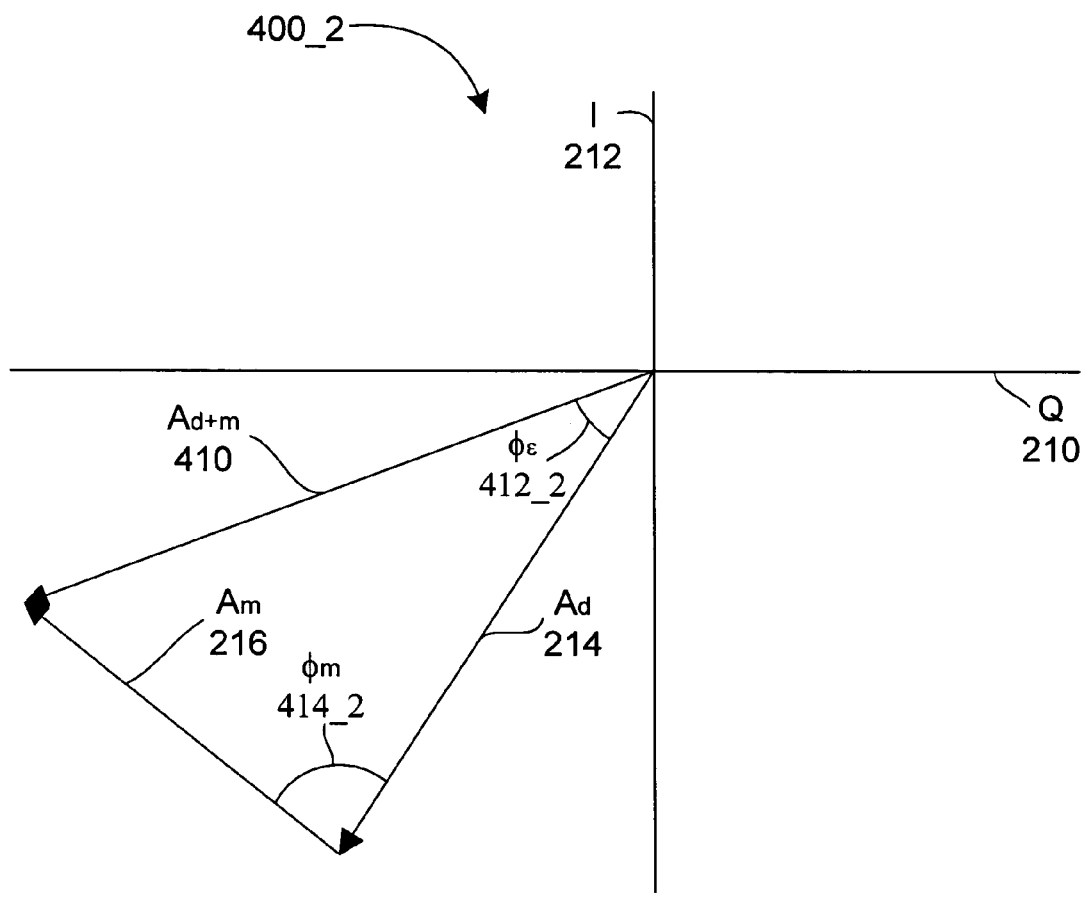
FIG. 4B illustrates a tracked vector in the device after the direct-path signal has undergone a phase reversal.

Referring to FIG. 4B, due to a time delay $\delta$ of the multi-path signal 116 (FIG. 1) relative to the direct-path signal 114 (FIG. 1), a phase reversal occurs for the direct-path signal 316 (FIG. 3) at the device 110 (FIG. 1) before the multi-path signal 318 (FIG. 3). This gives rise to a different phase (not shown) for the composite signal 314 (FIG. 3), and new values for a phase error $\phi_\epsilon$ 412_2 and a phase difference $\phi_m$ 414_2 in the tracking process 400_2. FIG. 4B corresponds to times during the time interval 320 (FIG. 3).

Figure 4C:
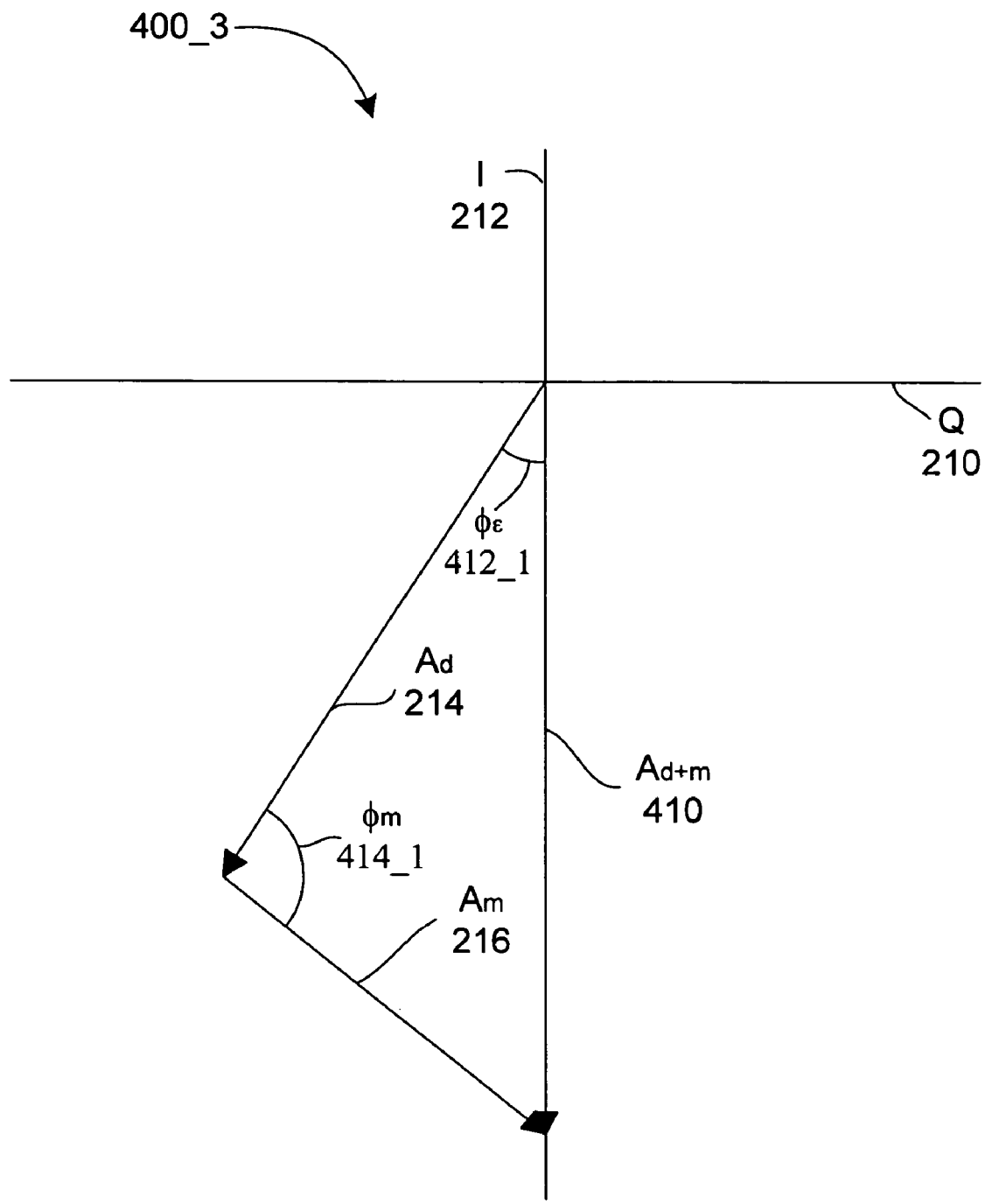
FIG. 4C illustrates a tracked vector in the device after the direct-path signal and the multi-path signal have undergone the phase reversal.

Referring to FIG. 4C, after the phase reversal occurs for the multi-path signal 318 (FIG. 3), there will be an original phase (not shown) for the composite signal 314 (FIG. 3), and the phase error $\phi_\epsilon$ 412_1 and the phase difference $\phi_m$ 414_1 in the tracking process 400_3 will return to the values in the tracking process 400_1. FIG. 4C corresponds to times after to the time interval 320 (FIG. 3).

By measuring the phase of the composite signal 314 (FIG. 3) in FIG. 4B, after the code transition of the direct-path signal 316 (FIG. 3) but before the code transition of the multi-path signal 318 (FIG. 3), the phase error $\phi_e$ 412_1 in the tracking process 400_1 can be calculated. Referring to FIG. 3, the first technique, however, assumes that the code transitions in both the direct-path signal 316 and the multi-path signal 318 occur instantaneously. This assumption is not correct due to filtering in the device 110 (FIG. 1), and/or one or more satellites, which band-limits the direct-path signal 316 and the multi-path signal 318. The first technique is, therefore, only suitable for correcting multi-path-induced errors when the time delay δ is sufficiently large to allow the filtered code transition of the direct-path signal 316 to achieve steady-state before the filtered code chip transition of the multi-path signal 318 begins to transition. This limits the first technique to longer multi-path delays. Unfortunately, the multi-path signals that produce the longest term phase errors in the tracking process, such as tracking process 400_1 (FIG. 4A), which in turn lead to phase measurement biases, usually have much shorter delays than a filter step response time of one or more filters in the device 110 (FIG. 1) and/or one or more satellites.

Figure 5:
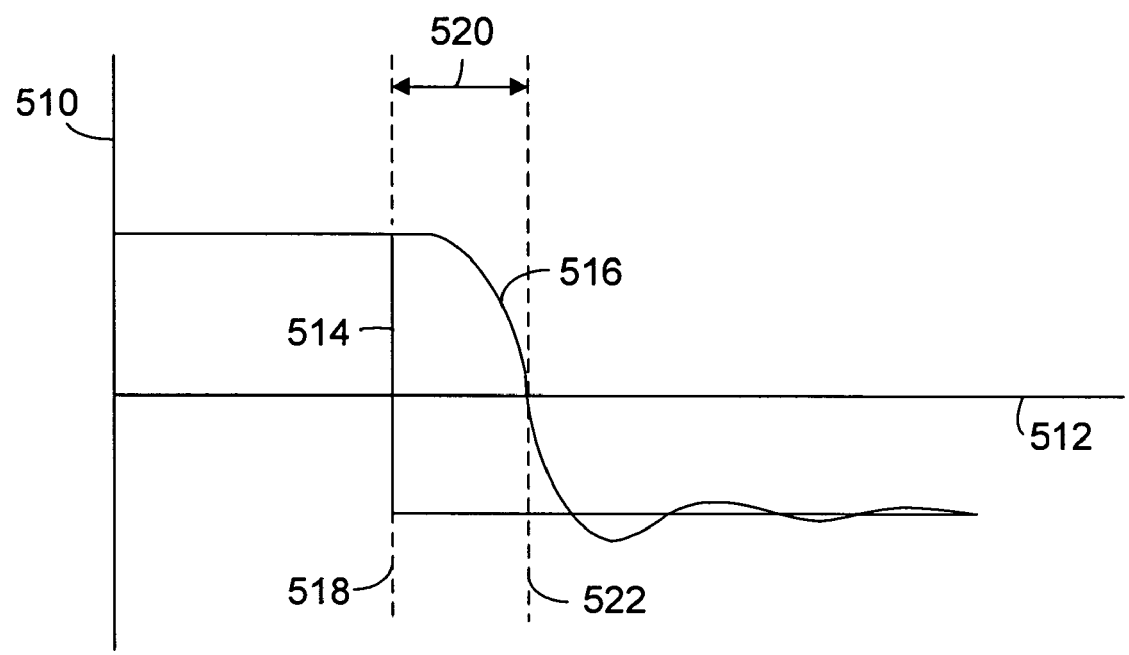
FIG. 5 illustrates a filter step response and the receiver tracking error caused by multi-path.

The limitations of the first technique can be further understood by comparing the filter step response of a band-pass filter that is typical of high-precision global navigation satellite systems (GNSS) and an instantaneous filter step response, such as that assumed in the existing technique. FIG. 5 illustrates the magnitude 510 versus time 512 of an instantaneous filter step response 514 and a filter step response 516 of a 6-pole Butterworth filter with an intermediate frequency equivalent bandwidth of 30 MHz. Note there a time error Δt 520 between a time $t_1$ 522 corresponding to a zero crossing in the filter step response 516 and a time 518 corresponding to the ideal instantaneous step response 514. With the time delay inherent in any filter response eliminated from the diagram, the time error Δt 520 illustrates a code-tracking error caused by code multi-path. Some sophisticated correlator designs, such as those using a double-delta correction, reduce this error but do not eliminate it.

A bandwidth of 30 MHz is wide for receivers in current high precision global navigation satellite systems (GNSS) but bandwidths of this magnitude are becoming more common as signal processing speeds increase, in part to achieve greater observability of multi-path signals. In addition, this bandwidth is typical of signal bandwidths supported by the modern satellites in the global navigation satellite systems (GNSS). Some typical filters with a bandwidth of 30 MHz have a filter step response time of almost 50 ns to transition the phase reversal and do not obtain steady state for almost 150 ns. Other filters have a filter step response time of almost 40 ns to transition the phase reversal and steady state is not obtained for almost 200 ns (i.e., the filter step response time corresponding to the filter is between 40 ns and 200 ns, and more generally is less than or equal to 200 ns). Other filters have a bandwidth of 10 MHz and a filter step response time less than 1 μs. Tracking processes 400 in FIGS. 4A-4C are only a reasonable model when the time delay δ is greater than about 50 ns, which requires that a difference in the path-length of the direct-path signal 114 (FIG. 1) and the multi-path signal 116 (FIG. 1) be at least 50 feet.

Figure 6:
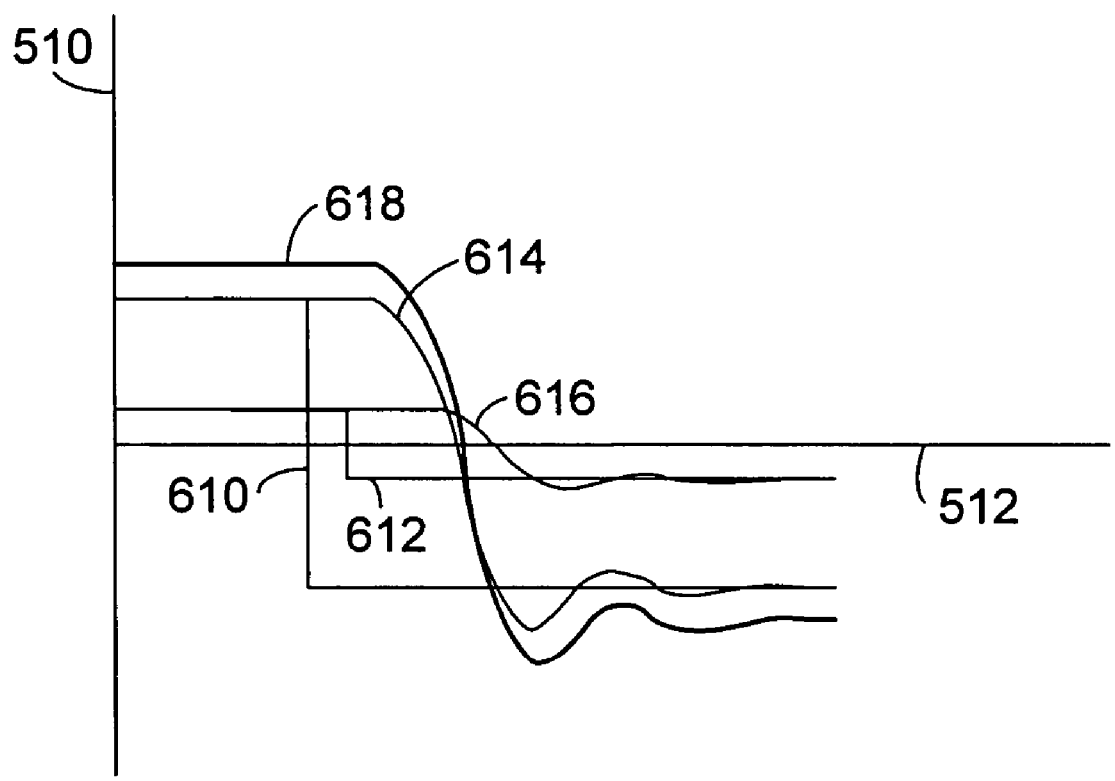
FIG. 6 illustrates the filter step response for the direct-path signal, the multi-path signal and the composite signal.

The consequences of the filter step response for the direct-path, multi-path and composite signals are illustrated in FIG. 6 including direct-path instantaneous filter response 610, multi-path instantaneous filter response 612, direct-path filter step response 614, multi-path filter step response 616 and composite filter step response 618. Note that in addition to the filter step response, such as filter step response 516 (FIG. 5), filter characteristics of filters, in receivers such as in device 110 (FIG. 1) and/or in one or more satellites, may also be characterized based on a filter impulse response or a complex filter transfer function.

Figure 2:
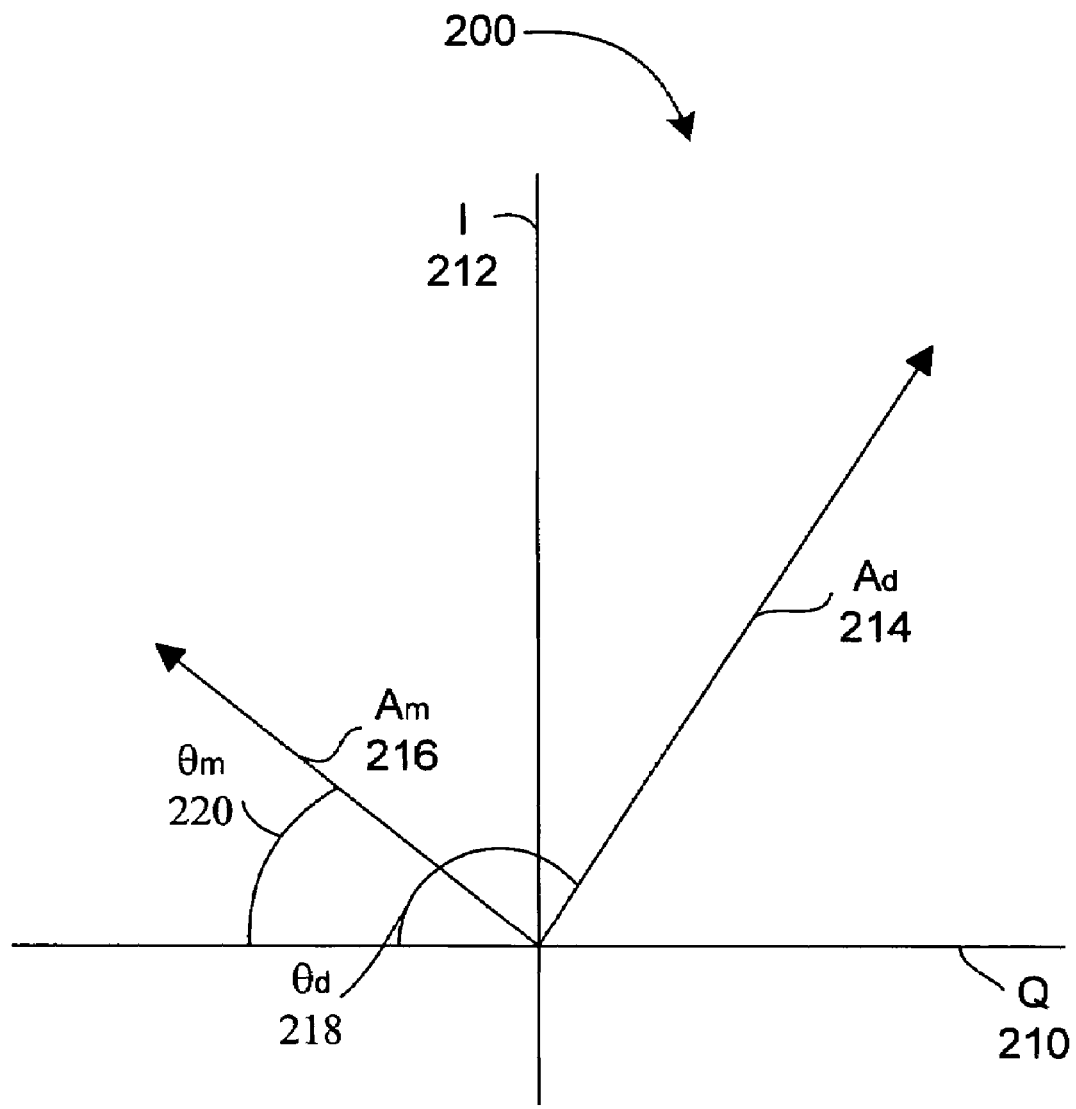
FIG. 2 illustrates a phasor diagram of the in-phase and quadrature components of the direct-path signal and the multi-path signal.
Figure 7:
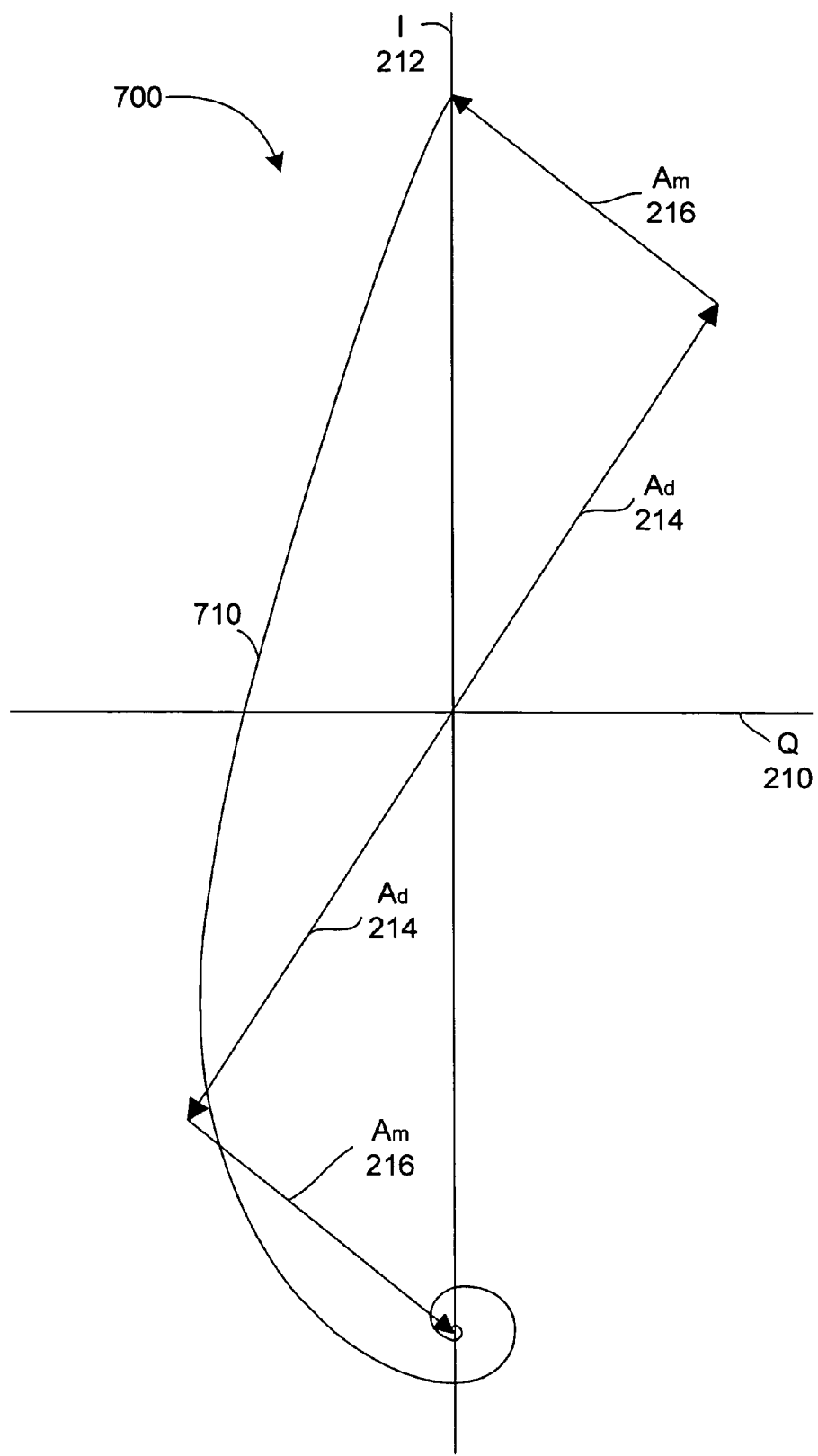
FIG. 7 illustrates a tracked vector during phase reversal of a band-limited direct-path signal and a band-limited multi-path signal.

FIG. 7 illustrates a tracking process 700 for tracking a multi-path signal 116 (FIG. 1) having a path length difference less than 50 feet during the code chip transitions for the direct-path signal 316 (FIG. 3) and the multi-path signal 318 (FIG. 3). In this illustration, the direct-path signal 316 (FIG. 3) and the multi-path signal 318 (FIG. 3) are band limited using a filter having a filter step response such as filter step response 516 (FIG. 5). The I 212 and Q 210 components of the tracking process 700 during the code chip transitions follow trajectory 710 rather than the instantaneous transitions shown in FIGS. 4A-4C. Note that the trajectory 710 shows that a vector representing the multi-path signal 216 (FIG. 2) begins the code transition before a vector representing the direct-path signal 214 (FIG. 2) has concluded its code transition. As described below, by fitting a measured trajectory 710 during the code transitions in the direct-path signal 114 (FIG. 1) and the multi-path signal 116 (FIG. 1) in accordance with at least a predetermined filter characteristic, such as the filter step response 516 (FIG. 5), one or more multi-path-induced errors may be determined and mitigated.

Figure 8:
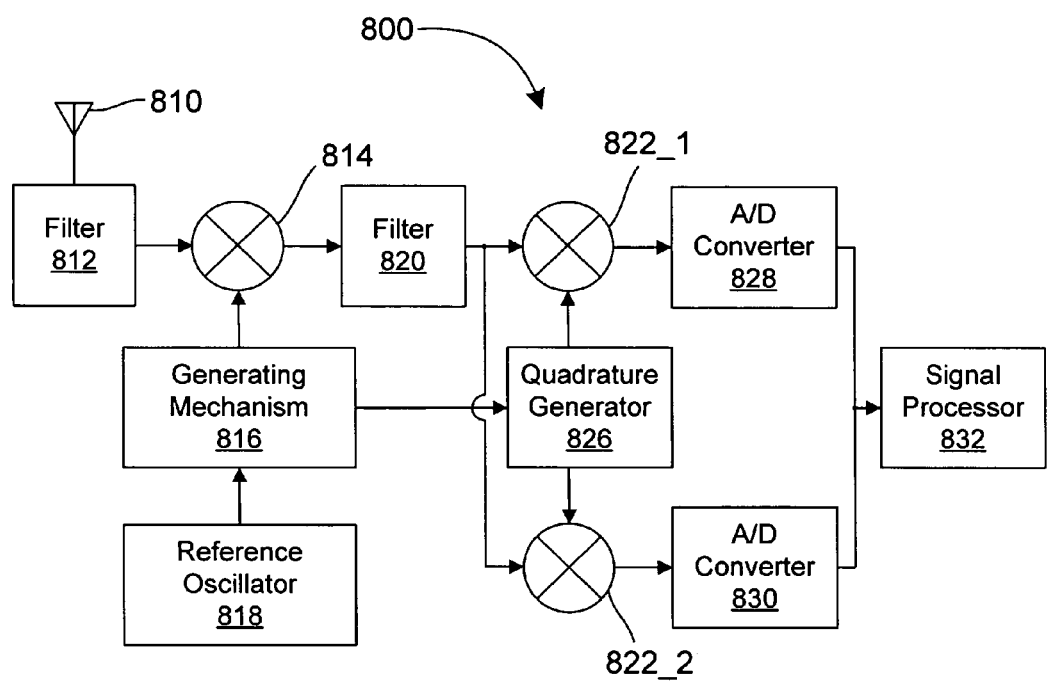
FIG. 8 is a block diagram of front-end electronics in a typical device for use in the global navigation satellite system (GNSS).

A block diagram of a typical front-end 800 of a receiver in a device, such as device 110 (FIG. 1), is shown in FIG. 8. An antenna 810 receives a signal from one or more satellites. In some embodiments, the antenna 810 is equipped with a built-in amplifier. The signal is passed through a wide-bandwidth filter 812 to exclude out-of-band interference. After filtering, the signal consists of an L-band carrier signal that has been spread across a 10 MHz or wider bandwidth by an embedded spread-spectrum pseudo-random-noise code. The total information content of the signal is determined by the bandwidth of the satellite. In one embodiment, this bandwidth is slightly less than 30 MHz.

The L-band signal is next down-converted to an intermediate or base band frequency in mixer 814 by mixing with a signal generated by generating mechanism 816 based on reference oscillator 818 and is filtered by a band-pass filter 820. The down conversion step is typically included, but is not required, because it is much easier to sample and filter signals at frequencies of a few hundred Megahertz or lower than it is to work with signals at the 1 to 2 GHz L-band transmitted carrier signal frequencies. The bandwidth of the final filter 820 must be at least the bandwidth of the satellite signal (e.g., 30 MHz) or a portion of the information content of the satellite signal will be lost. In particular, the details of the code transitions are degraded if the bandwidth of the filter 820 is less than the satellite bandwidth, which for newer GPS satellites is about 30 MHz.

Quadrature generator 826 and mixers 822_1 and 822_2 generate in-phase I and quadrature Q components of the filtered signals. In some embodiments, the quadrature generator 826 and the mixers 822 also provide a final down conversion of the signals to base band. The in-phase I and quadrature Q signals are converted from analog-to-digital form by A/D converters 828 and 830. In some embodiments, the in-phase I signals and quadrature Q signals are hard-limited or clipped. The digital samples are processed by a signal processor 832.

Note that in some embodiments multi-bit A/D conversions are used in order to limit signal processing losses. In addition, A/D converters 828 and 830 may have very narrow sampling apertures so the timing of the samples is precisely known. Wide aperture converters produce samples that are the average value of the analog signal over the aperture period, which equivalently attenuates the high frequency content of the signal that is sampled. In addition, the sampling rate of the A/D converters 828 and 830 must exceed the Nyquist requirements based on the information bandwidth of the signals. Since the satellite signals have an information bandwidth on the order of 30 MHz, the receiver must either make complex (in-phase I and quadrature Q) measurements at a rate equal to or greater than 30 MHz or make real measurements (with a single A/D converter) at a rate that is at least twice the information bandwidth. In an exemplary embodiment of the device 110 (FIG. 1), complex measurements are made at a rate of 40 MHz.

Figure 9:
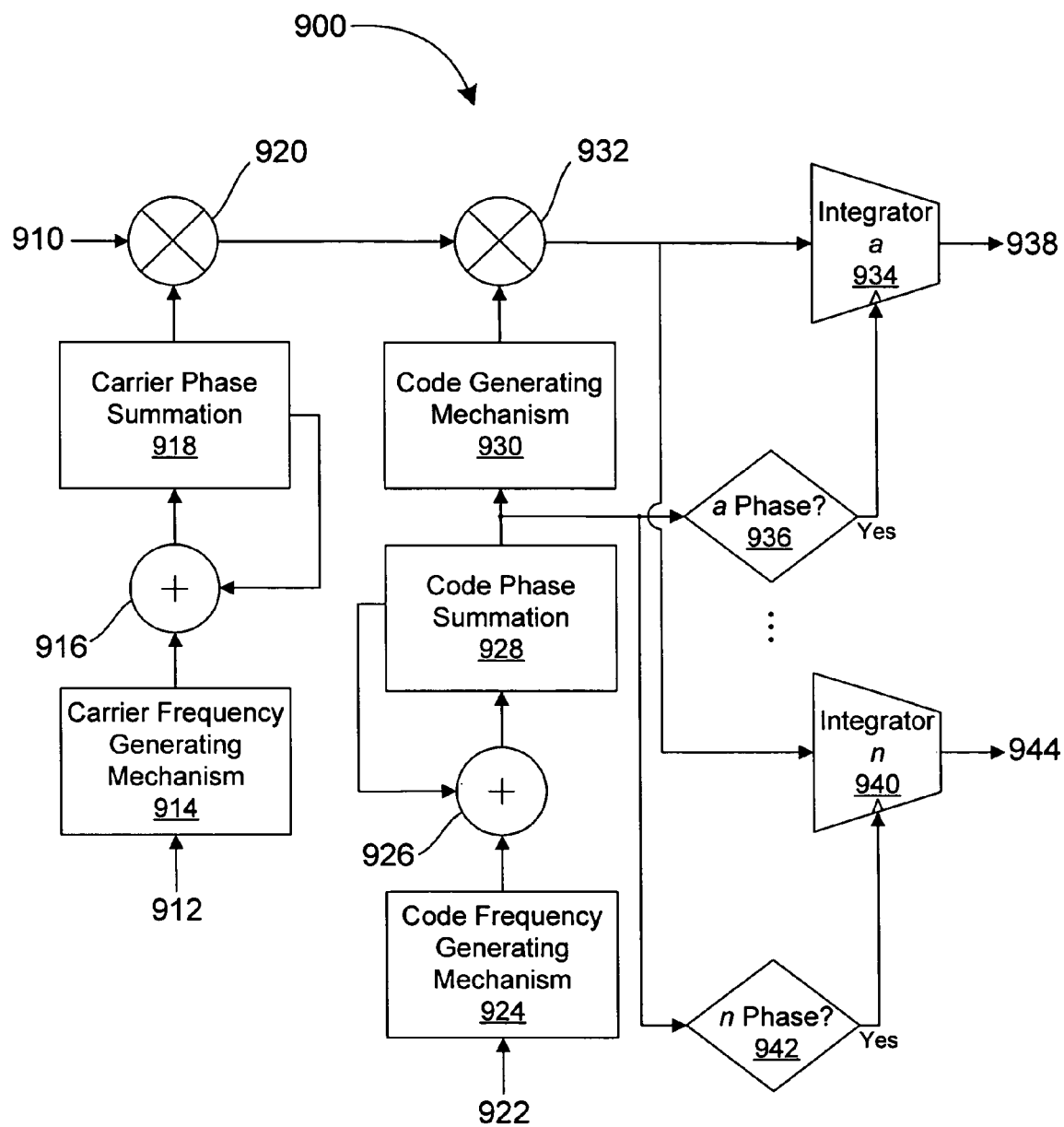
FIG. 9 is a block diagram of signal processing in the typical device for use in the global navigation satellite system (GNSS).

FIG. 9 is a block diagram of a signal processor 900 suitable for use as signal processor 832 in FIG. 8. FIG. 9 depicts a single receiver channel. In some receivers, there are 10 to 50 nearly identical channels to receive signals from different satellites. Note that in order to perform the signal processing functions described below, the receiver must already have coherent tracking of signals from one or more satellites. In particular, there must be carrier lock, where a Doppler of a reference signal in a carrier tracking loop (not shown) in the receiver matches the Doppler of the carrier signal, and a code lock based on a code tracking loop (not shown) in the receiver, which allows the recovery of the maximum of the signal power in the spread-spectrum pseudo-random-noise code.

The signal processor 900 receives in-phase I and quadrature Q samples 910 from the front-end 800 of the receiver. The samples 910 are mixed in mixers 920 and 932 with a replica of the carrier signal and code signal. In some embodiments, the mixing in mixers 920 and 932 may be performed in reverse order or may be combined in a single mixing step. The mixing in mixer 920 consists of a complex rotation of the in-phase I and quadrature Q samples 910 by an angle corresponding to a phase of the replica of the carrier signal. The angle is generated by an output 912 from the carrier tracking loop that drives a carrier frequency generating mechanism 914. An adder 916 and carrier phase summation 918 generate a running digital summation corresponding to the phase. The rotation may be performed on the samples 910 at the code chip rate. This rotation removes any Doppler and any remaining intermediate frequency phase rotations from the samples 910. In some embodiments, the rotation takes place fast enough to satisfactorily, i.e., with measurable instrumentation loss, remove any Doppler and/or any remaining intermediate frequency phase rotations from the samples 910. The carrier tracking loop, which controls the phase and frequency of the replica of the carrier signal by feedback, may be implemented in an Application Specific Integrated Circuit (ASIC), in software or a combination of an ASIC and software. If the phase and frequency of the replica of the carrier signal are correct, the results of the rotation are true-base-band, zero-Doppler samples.

The mixing in mixer 932 removes the spread-spectrum pseudo-random-noise code from the samples. The phase and timing of the code are controlled by feedback from the code tracking loop that may be implemented in an ASIC, in software or a combination of an ASIC and software. Output 922 from the code tracking loop drives a code frequency generating mechanism 924. Adder 926 and code phase summation 928 generate a running digital sum. An output from the code phase summation 928 drives a code generating mechanism 930. For a bi-phase modulation, an output from the code generating mechanism 930 is ±1 corresponding to binary phase shift keying. The output of the code generating mechanism 930 may change sign only at the code chip edge rate.

If the phase and frequency of the replica of the code signal is correct, the code is removed from the samples and the samples are said to be correlated. The resulting de-spread samples represent constant, zero-Doppler samples (DC term) that can be integrated over time. Successfully correlated samples can be summed for extended intervals to improve a signal-to-noise ratio of the measurements. If the timing of the replica of the code signal is less than one code chip period in error (for the coarse acquisition code, for example, the code chip period is approximately 1 microsecond, the inverse of the code chip rate), the successive samples are de-correlated, and integration over time produces a smaller result than successfully correlated samples. If the timing of the replica of the code signal is greater than one code chip period in error, the successive samples are uncorrelated, and integration over time produces a near zero-mean result.

The samples of the satellite signal may be categorized according to the phase of the carrier frequency generating mechanism 914 and the code frequency generating mechanism 924. Typically, the carrier tracking loop uses all of the samples because this provides the best signal-to-noise ratio. On the other hand, the code tracking loop typically uses a subset of the samples, depending on an error discriminator that is used, such as double delta, strobed correlator or pulse amplitude correlator. In some embodiments, in order to obtain the best multi-path rejection, only the portion of the measured samples corresponding to code transitions that are near the code chip edges are used. For example, the code tracking loop may be configured to sum only those samples having a code phase fraction that is between 0.75 to 0.25 P-code chip periods (0.75 to 1.0 and 0.0 to 0.25). In this example, samples with phases between 0.25 and 0.75 (greater than 0.25 and less than 0.75) are discarded by the code tracking loop.

The satellite signal samples (other than ones that are discarded) are directed to a series of accumulators. Blocks 936 and 942 check the phase of the code phase summation 928 and enable the corresponding integrator (e.g., one of the integrators 934 and 940, which have outputs 938 and 944) for integrating a particular sample. While two accumulators are shown in FIG. 9, there may be additional accumulators. Typically, for a given receiver channel there are between 8 and 32 accumulators, each of which is used to accumulate satellite signal samples for a range of phases corresponding to that accumulator. In an exemplary embodiment, there are 16 accumulators. The use of multiple accumulators per channel enables tracking of the transition trajectory, such as trajectory 710 (FIG. 7). In addition, the larger number of accumulators can be used to increase the code search rate during signal acquisition.

Figure 10:
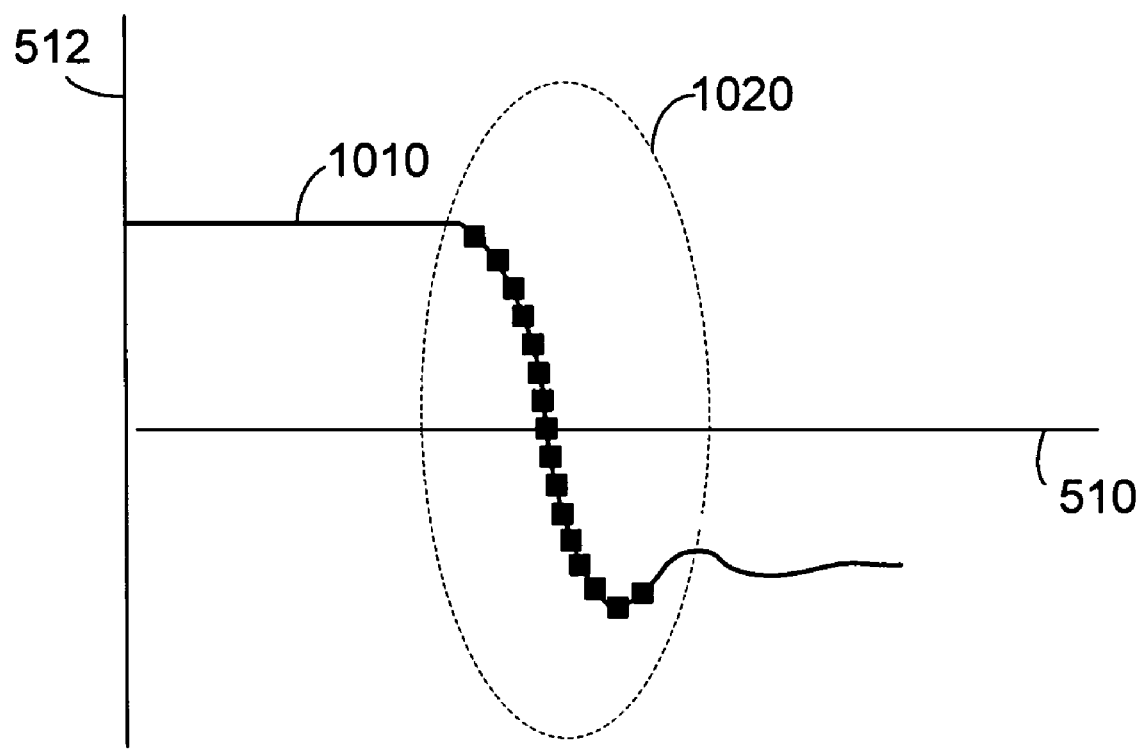
FIG. 10 illustrates accumulators sampling the filter step response.

FIG. 10 provides an illustration of integrated samples 1020 corresponding to sixteen accumulators relative to the filter step response 1010. The integrated samples 1020 are generated by selectively integrating in-phase I and quadrature Q samples having the appropriate phase relative to the code chip edges.

Receivers may be categorized based on the number of integrators used by the receivers to integrate samples which are categorized based on their position relative to the code chip edges. The receivers typically take a nearly exact integer number of samples per code chip period. Each sample is assigned a sample number, and the receiver separately integrates for each sample number the respective samples, across multiple transitions. For example, if the receiver has four in-phase I and quadrature Q sample pairs per code chip period, it achieves a plus or minus one-quarter chip correlation by numbering the samples 1 through 4 relative to the code chip edge and by summing two subsets of the samples. A first subset only includes the sample 4, the one that occurs just before the code chip edge. A second subset only includes the sample 1, the one that occurs just after the code chip edge.

Intervals between the integrated samples 1020 may be 5 ns or less. A complex sampling and data processing rate of at least 200 MHz is required if the sampling technique described above is used to create such narrow sampling subsets. Such a high sampling rate is very expensive to implement in terms of power consumption, parts cost and implementation difficulty. It does, however, provide a high signal-to-noise ratio because there is at least one sample for every accumulator from every code transition.

In some embodiments, an alternative technique may be used to achieve the same results with much slower sampling rates. In these embodiments, the sample rate may be as low as 30 MHz, the lowest speed allowed by the Nyquist limit. This technique uses a sampling rate that is not an integer multiple of the code chip rate. Therefore, the timing of the samples with respect to the code transition changes with every code transition. Referring to FIG. 8, in these embodiments the reference oscillator 818 is intentionally offset relative to the carrier signal frequency from the one or more satellites, typically by 40-100 ppm (with a greatest dependance on the temperature of the reference oscillator 818). This corresponds to 60-150 kHz for L1 (1 ppm equals 1.57542 kHz at L1) and mimics the effect of a residual Doppler shift in the samples from A/D converters 828 and 830. This offset ensures that a timing of the code transitions will slowly vary with respect to a sampling time. This ensures that samples of the code transitions are uniformly distributed across multiple accumulators in the channel over a period of time.

Referring to FIG. 9, the phase of the code phase summation 928 for the replica of the code signal is used to determine which integrator, such as integrator 934, receives the sample for a given code transition. All that is required to provide finely spaced samples is a correspondingly fine test of the phase of the replica of the code signal. Since a temporal spacing of the samples is larger than a time interval between each of the accumulators, only a fraction of the accumulators are assigned a sample for each code transition. In fact, in some embodiments, only one accumulator is assigned a sample for each code transition. Over the span of many code chip periods, however, each accumulator receives many samples. This technique does have a relative disadvantage with respect to signal-to-noise ratio because only a fraction of the accumulators receive a sample for each code transition. Since a correlation time of multi-path signals having a path-length difference less than 50 ft is very long, however, the integrations can be continued for longer periods in order to achieve a required signal-to-noise ratio. Integration times of 100 ms to several seconds are sufficient, and are much shorter than the correlation time of multi-path signals having a path-length difference less than 50 ft.

If the exact shape of the trajectory 710 (FIG. 7) can be observed, the effect of multi-path-induced errors can be determined and removed. As shown in FIG. 6, multi-path interference has several observable effects upon the composite filter step response 618 including an increase in the amplitude, an increase in the filter characteristic response time such as a time duration of a step response and the time error Δt 520 (FIG. 5) between the start of the phase reversal and the zero crossing.

The basic concept of the system and method is that the transition trajectory 710 (FIG. 7) and one or more multi-path-induced errors can be modeled by observing deviations between the observed composite signal, such as composite signal 314 (FIG. 3), and a computed direct signal using a pre-determined filter characteristic, such as filter step response 516 (FIG. 5). In some embodiments, the pre-determined filter characteristic is determined in a calibration procedure. In other embodiments, the calibration procedure may be repeated, for example, if there is a change in operating temperature. In some embodiments, the pre-determined filter characteristic may be based on the assumed filter of the satellite or the receiver. The pre-determined filter characteristic need not be a perfect replica of the actual filter characteristic. Rather, it needs to be similar enough to enable substantial mitigation of one or more multi-path-induced errors.

The required observations are illustrated by the integrated samples 1020 in FIG. 10. Although FIG. 10 represents the observations as one dimensional (real) samples, the samples of the code transition may be taken as two-dimensional (complex) samples, providing both an amplitude, such as composite signal amplitude $A_{d+m}$ 410 (FIG. 4A), and a phase (not shown) of the composite signal. If the shape of an error curve can be calculated, the amplitude $A_m$ 216 (FIG. 2), phase $\theta_m$ 220 (FIG. 2) and the time delay δ of the multi-path signal 116 (FIG. 1) corresponding to the path-length difference can be determined and substantially corrected. In so doing, the phase error $\phi_\epsilon$ 412_1 (FIG. 4A) induced by the multi-path signal 116 (FIG. 1) can be robustly estimated and the multi-path-induced phase error can be mitigated. A signal analysis method (sometimes herein called an algorithm) that estimates the phase error $\phi_\epsilon$ 412_1 (FIG. 4A) based upon the model of the transition trajectory 710 (FIG. 7) is described below.

This signal analysis method estimates the parameters that define the trajectory 710 (FIG. 7), allowing the trajectory 710 (FIG. 7) to be modeled. In the description of the algorithm that follows, two time indices are used. A j index represents the actual or iteration time of a set of data. The signal analysis is iterated each time a full and independent set of measurements is made (after integrating over many code transition cycles). The iteration time is chosen so that it is long enough to provide sufficient signal-to-noise ratio for a robust estimation and short enough that changes in the multi-path signal 116 (FIG. 1) can be observed. As noted previously, since multi-path interference with a short path-length difference, i.e., less than 50 ft, varies slowly with time, multi-path correlation times on the order of several hundreds of seconds occur, and iteration rates from 100 ms to a few seconds are typical. A k index represents a time delay of a specific data sample within the set of data relative to the instantaneous step response time $t_0$ 518 (FIG. 5) corresponding to an ideal code transition. Referring to FIG. 10, when k is equal to zero, the data sampled at the left most of the integrated samples 1020 is referenced, and corresponds to the start of the code transition. When k is equal to one, the data sample corresponds to the next point to the right, and so on across the filter step response 1010.

The signal analysis method estimates the following parameters:

the amplitude of the direct-path signal $A_d$ 214 (FIG. 2);
the amplitude of the multi-path signal $A_m$ 216 (FIG. 2);
the phase error $\phi_\epsilon$ 412_1 (FIG. 4A);
the phase difference $\phi_m$ 414_1 (FIG. 4A); and
the time delay δ.

The signal analysis method uses the following inputs:

a pre-determined filter step response SR(t), where t is time;
the amplitude of the composite signal $A_{d+m}$ 410 (FIG. 4A), measured using a steady-state signal tracking loop (not shown); and
the in-phase I(t) and quadrature Q(t) base-band measurements taken at multiple times during the code transitions.

For a given code transition, I(t) and Q(t) can be expressed as $$I(t)=A_d \cdot SR(t)\cdot\cos(\phi_\epsilon)+A_m\cdot SR(t-\delta)\cdot\cos(\phi_{3rd})$$

$$Q(t)=A_d\cdot SR(t)\cdot\sin(\phi_\epsilon)-A_m\cdot SR(t-\delta)\cdot\sin(\phi_{3rd}), \quad (1)$$

where $\phi_{3rd}$ is the phase $\phi_{3rd}$ 416_1 given by $$\phi_{3rd} = \pi - (\phi_\epsilon + \phi_m).$$

Since the signal analysis method estimates a number of interrelated quantities, it has two procedures. A first procedure estimates the phase $\phi_{3rd}$ 416_1 (FIG. 4A) and the time error $\Delta t$ 520 (FIG. 5). Note that time error $\Delta t$ 520 (FIG. 5) also corresponds to the error in the reconstructed code timing in the receiver. The signal analysis method determines a proper time alignment of the code transition and the measured time of the transition, represented by the timing of the I(t) and Q(t) samples. Proper time alignment is important since a second procedure depends sensitively on the time $t_0$ 518 (FIG. 5) corresponding to the ideal instantaneous step response 514 (FIG. 5) and the start of the trajectory 710 (FIG. 7). The second procedure estimates the remaining parameters. The first procedure in the algorithm is described first below.

The transition trajectory 710 (FIG. 7) is a plot of the I(t) versus Q(t) at the time of a code transition on the direct-path signal 114 (FIG. 1), followed closely in time by the same code transition of the delayed multi-path signal 116 (FIG. 1). The filter step response, such as filter step response 1010 (FIG. 10), of a filter in either the receiver or a satellite defines the shape of these code transitions. As shown in FIG. 5, the code transitions are a function of time. As noted previously, however, the pre-determined filter step response need not be a perfect replica of the actual filter characteristic. Also note that an initial estimate for the time $t_0$ 518 corresponding to the ideal instantaneous filter step response is provided by the code tracking loop (not shown). The estimate for the time error $\Delta t$ 520 determined in the first procedure of the signal analysis method is an accurate estimate of any residual multi-path-induced code-tracking error in the initial estimate for the time $t_0$ 518 and, thus, the pseudo-range measurement. The parameters determined in this technique can, therefore be used to correct this residual multi-path-induced error in the pseudo-range navigation computation as well as the phase error $\phi_\epsilon$ 412_1 (FIG. 4A).

By modifying Equation 1, an equation that allows the time error $\Delta t$ 520 to be identified can be generated. Defining $$x = A_{d+m} \cdot SR(t_0) - I(t_1)$$

and $$y = Q(t_1),$$

where the time $t_0$ 518 is the initial estimate provided by the code tracking loop and the time $t_1$ 522 is the actual time of the code transition including the effect of the multi-math signal 116 (FIG. 1). Using I(t) and Q(t) from Equation 1 yields $$x(t_1) = A_{d+m} \cdot SR(t_0) - [A_d \cdot SR(t_1) \cdot \cos(\phi_\epsilon) + A_m \cdot SR(t_1 - \delta) \cdot \cos(\phi_{3rd})]$$

$$y(t_1) = A_d \cdot SR(t_1) \cdot \sin(\phi_\epsilon) - A_m \cdot SR(t_1 - \delta) \cdot \sin(\phi_{3rd}). \quad (2)$$

Substituting based on the trigonometric relation (from FIG. 4A)

$$A_{d+m} = A_d \cdot \cos(\phi_\epsilon) + A_m \cdot \cos(\phi_{3rd})$$

results in $$x(t_1) = A_d \cdot [SR(t_0) - SR(t_1)] \cdot \cos(\phi_\epsilon) + A_m \cdot [SR(t_0) - SR(t_1 - \delta)] \cdot \cos(\phi_{3rd})$$

$$y(t_1) = A_d \cdot SR(t_1) \cdot \sin(\phi_\epsilon) - A_m \cdot SR(t_1 - \delta) \cdot \sin(\phi_{3rd}).$$

Multiplying $x(t_1)$ by $$\tan(\phi_{3rd}) = \frac{\sin(\phi_{3rd})}{\cos(\phi_{3rd})}$$

yields $$x(t_1) \cdot \tan(\phi_{3rd}) = A_d \cdot [SR(t_0) - SR(t_1)] \cdot \cos(\phi_\epsilon) \cdot \tan(\phi_{3rd}) + A_m \cdot [SR(t_0) - SR(t_1 - \delta)] \cdot \sin(\phi_{3rd})$$

$$y(t_1) = A_d \cdot SR(t_1) \cdot \sin(\phi_\epsilon) - A_m \cdot SR(t_1 - \delta) \cdot \sin(\phi_{3rd}).$$

Subtracting the second equation from the first and rearranging results in $$y(t_1) = x(t_1) \cdot \tan(\phi_{3rd}) - A_d \cdot [SR(t_0) - SR(t_1)] \cdot \cos(\phi_\epsilon) \cdot \tan(\phi_{3rd}) + [A_d \cdot SR(t_1) \cdot \sin(\phi_\epsilon) - A_m \cdot SR(t_0) \cdot \sin(\phi_{3rd})].$$

Referring to FIG. 4A, note that $$A_d \cdot \sin(\phi_\epsilon) = A_m \cdot \sin(\phi_{3rd}).$$

Substituting this relationship into the proceeding equation, yields $$y(t_1) = x(t_1) \cdot \tan(\phi_{3rd}) - A_d \cdot [SR(t_0) - SR(t_1)] \cdot \cos(\phi_\epsilon) \cdot \tan(\phi_{3rd}) + [A_m \cdot SR(t_1) \cdot \sin(\phi_{3rd}) - A_m \cdot SR(t_0) \cdot \sin(\phi_{3rd})].$$

Simplifying this equation yields $$y(t_1) = x(t_1) \cdot \tan(\phi_{3rd}) - [SR(t_0) - SR(t_1)] \cdot [A_d \cdot \cos(\phi_\epsilon) \cdot \tan(\phi_{3rd}) + A_m \cdot \sin(\phi_{3rd})].$$

Further simplifying results in $$y(t_1) = x(t_1) \cdot \tan(\phi_{3rd}) - [SR(t_0) - SR(t_1)] \cdot [A_d \cdot \cos(\phi_\epsilon) + A_m \cdot \cos(\phi_{3rd})] \cdot \tan(\phi_{3rd}).$$

This expression can re-expressed as $$y(t_1) = x(t_1) \cdot \tan(\phi_{3rd}) - [SR(t_0) - SR(t_1)] \cdot [A_{d+m}] \cdot \tan(\phi_{3rd}).$$

For small values of the time error $\Delta t$ 520 (equal to the time $t_1$ 522 minus the time $t_0$ 518), $$y(t) = x(t) \cdot \tan(\phi_{3rd}) - \left[ A_{d+m} \cdot \frac{\partial}{\partial t}(SR(t)) \cdot [\Delta t \cdot \tan(\phi_{3rd})] \right].$$

The last equation for y(t) can be rewritten in matrix form for the n input I and Q samples in each data set corresponding to the a through n accumulators in the receiver $$\begin{bmatrix} x(t_{k1}) & -\left[A_{d+m} \cdot \frac{\partial}{\partial t}(SR(t_{k1}))\right] \\ x(t_{k2}) & -\left[A_{d+m} \cdot \frac{\partial}{\partial t}(SR(t_{k2}))\right] \\ \vdots & \vdots \\ x(t_{kn}) & -\left[A_{d+m} \cdot \frac{\partial}{\partial t}(SR(t_{kn}))\right] \end{bmatrix} \cdot \begin{bmatrix} \tan(\phi_{3rd}) \\ [\Delta t \cdot \tan(\phi_{3rd})] \end{bmatrix} = \begin{bmatrix} y(t_{k1}) \\ y(t_{k2}) \\ \vdots \\ y(t_{kn}) \end{bmatrix}. \quad (3)$$

Matrix Equation 3 can be solved in a number of ways but the simplest is a least squares fitting process. The results of this least squares calculation are the parameters of a straight line with a slope of $\tan(\phi_{3rd})$ and intercept that is proportional to the time error $\Delta t$ 520. In the first procedure, Equations 2 and 3 are used to form an estimator for the time error $\Delta t$ 520, which is used to iteratively update the time $t_0$ 518 until the time $t_0$ 518 equals the time $t_1$ 522 and $\Delta t$ is substantially zero, i.e., the y-intercept of the line equals zero. The estimate of the slope is used to form an estimate of the phase $\phi_{3rd}$ 416_1 (FIG. 4A). Specifically, the j-th estimate of the slope is updated according to $$\hat{slope}_j = \hat{slope}_{j-1} + \kappa \cdot (\tan(\phi_{3rd}) - \hat{slope}_{j-1}),$$

where $\kappa$ is an inverse of a loop gain. Typical values of the loop gain are between ten and one thousand. The loop gain may vary as the first procedure converges on a solution. A suitable convergence criterion is that a change in the estimated slope during an iteration is smaller than $10^{-4}$. The j-th estimate of the time $t_0$ 518 (FIG. 5) is $$\hat{t}_{0j} = \hat{t}_{0(j-1)} + \frac{[\Delta t \cdot \tan(\phi_{3\mathrm{rd}})]_{j-1}}{\hat{slope}_j}.$$

The estimate of the phase $\phi_{3rd}$ 416_1 (FIG. 4A) is given by $$\hat{\phi}_{3rd} = \tan^{-1}(\hat{slope}_j).$$

Initially, the slope estimate is run independently to allow the estimate of the slope to converge before updating the time $t_0$ 518. When the time $t_0$ 518 equals the time $t_1$ 522, Equation 3 reduces to $$y(t) = x(t) \cdot \tan(\phi_{3rd}). \qquad (4)$$

Therefore, when the solution to matrix Equation 3 produces an intercept equal to zero, the input x and y data of Equation 2 fit a straight line with a slope of $\tan(\phi_{3rd})$, since the data set is defined by the straight line of Equation 4.

Figure 12:
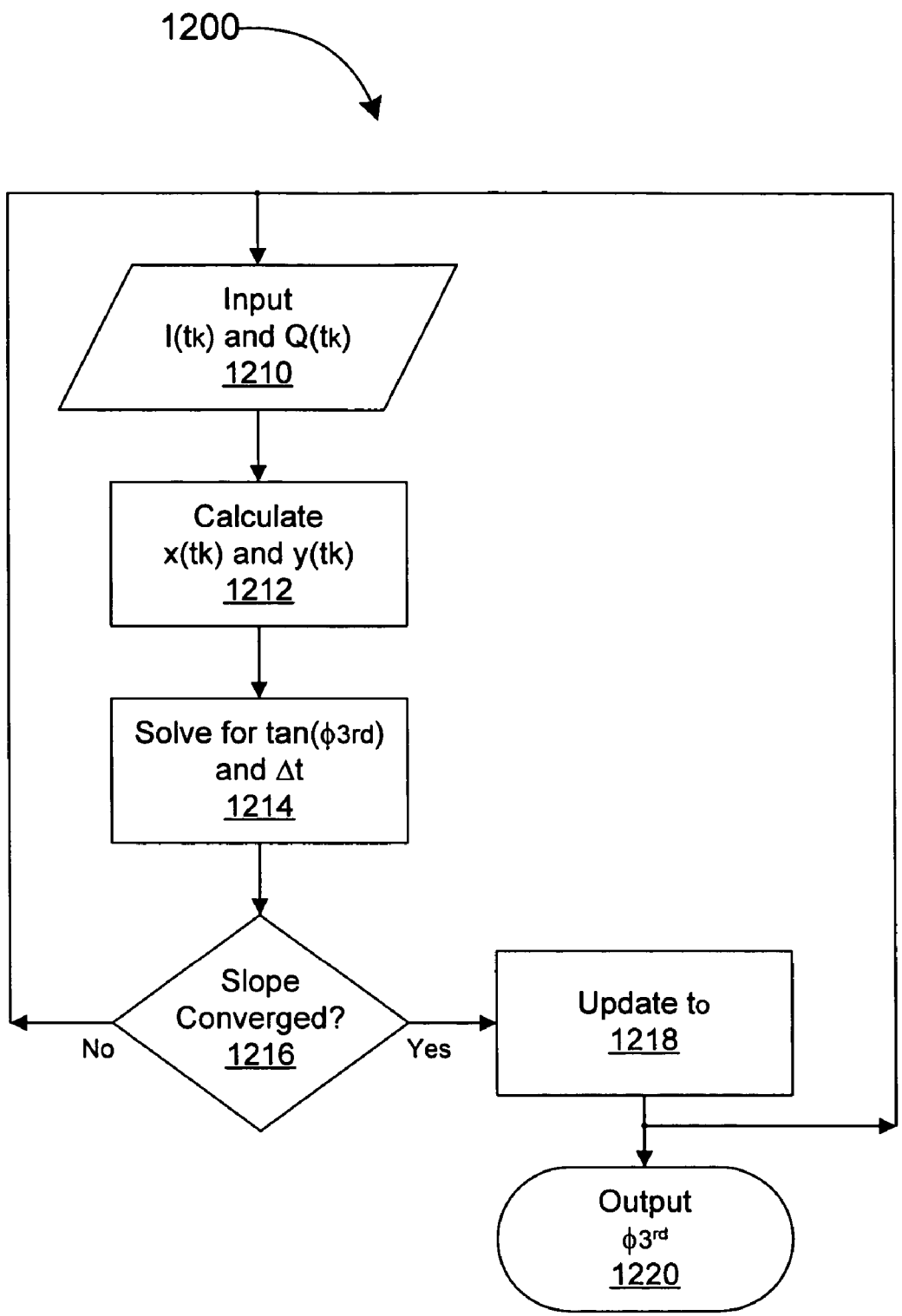
FIG. 12 is a block diagram illustrating a first procedure in a technique for determining a multi-path-induced error.

FIG. 12 is a flow chart for the first procedure 1200 in the signal analysis method. I(t) and Q(t) are input at step 1210. x(t) and y(t) are calculated at step 1212 and estimates for the time error $\Delta t$ 520 and $\tan(\phi_{3rd})$ are determined 1214. If the slope has not converged 1216, the steps are repeated. If the slope has converged 1216, the estimate for the time $t_0$ 518 is updated 1218, the phase the phase $\phi_{3rd}$ 416_1 (FIG. 4A) is output 1220 and the steps are repeated. The second procedure in the signal analysis method is now described.

After the correct timing is established and an initial estimate of the phase $\phi_{3rd}$ 416_1 (FIG. 4A) is produced, the remainder of the parameters describing the transition trajectory 710 (FIG. 7) are estimated. The signal analysis method first estimates the I-components of the parameters and then the Q-components of the parameters. In alternate embodiments, the signal analysis method may first estimate the Q-component parameters and then the I-component parameters. In yet other embodiments, the I-component parameters and the Q-component parameters may be estimated concurrently. The amplitude of the direct-path signal $A_d$ 214 (FIG. 2) is estimated from the two components $A_d \cdot \cos(\phi_e)$ and $A_d \cdot \sin$ ($\phi_e$). The amplitude of the multi-path signal $A_m$ 216 (FIG. 2) is estimated from the two components $A_m \cdot \cos(\phi_{3rd})$ and $A_m \cdot \sin(\phi_{3rd})$ using the estimate of the phase $\phi_{3rd}$ 416_1 (FIG. 4A) from the first procedure. The time delay $\delta$ is estimated separately using a Taylor expansion, which generates a term linear in $\delta$.

The quantities estimated in the second procedure are $$A_d \cos(\phi_e) \equiv \hat{A}_I$$

$$A_d \sin(\phi_e) \equiv \hat{A}_Q$$

$$A_m \equiv \hat{A}_m$$

$$\delta \equiv \hat{\delta}.$$

Rewriting Equation 1 in terms of the estimated quantities, yields $$\hat{I}(t_{jk}) = \hat{A}_I(t_j) \cdot SR(t_k) + \hat{A}_m(t_j) \cdot SR(t_k - \hat{\delta}(t_j)) \cdot \cos(\phi_{3rd})$$

$$\hat{Q}(t_{jk}) = \hat{A}_Q(t_j) \cdot SR(t_k) - \hat{A}_m(t_j) \cdot SR(t_k - \hat{\delta}(t_j)) \cdot \sin(\phi_{3rd}),$$

where subscript jk indicates a k-th data sample at iteration j. Measurement equations are then formed by taking a difference between an estimated I(t) and Q(t) and the I and Q data samples from the receiver $$x(k) = t_{jk}$$

$$y_I(k) = I(t_{jk}) - \hat{I}(t_{jk})$$
$$= (A_I - \hat{A}_I(t_j)) \cdot SR(t_k) + (A_m \cdot SR(t_k - \hat{\delta}(t_j)) - \hat{A}_m(t_j) \cdot SR(t_k - \hat{\delta}(t_j))) \cdot \cos(\phi_{3\mathrm{rd}})$$

$$y_Q(k) = Q(t_{jk}) - \hat{Q}(t_{jk})$$
$$= (A_Q - \hat{A}_Q(t_j)) \cdot SR(t_k) - (A_m \cdot SR(t_k - \hat{\delta}(t_j)) - \hat{A}_m(t_j) \cdot SR(t_k - \hat{\delta}(t_j))) \cdot \sin(\phi_{3\mathrm{rd}}).$$

A Taylor expansion around the estimate of the time delay $\delta$ is used to linearize these equations. Defining $$\Delta \hat{A}_I(j) = A_I - \hat{A}_I(j)$$

$$\Delta \hat{A}_Q(j) = A_Q - \hat{A}_Q(j)$$

$$\Delta \hat{\delta}(j) = \delta - \hat{\delta}(j)$$

and using only the subscripts of time (the iteration of data set is j and the sample within the iteration of the data set is k) and dropping the symbol t, yields $$x(k) = k$$

$$y_I(k) = \Delta \hat{A}_I(j) \cdot SR(k) + \Delta \hat{A}_m(j) \cdot SR(k - \hat{\delta}(j)) \cdot \cos(\phi_{3\mathrm{rd}}) +$$
$$\hat{\Delta \delta}(j) \cdot \frac{\partial}{\partial t}(SR(k - \hat{\delta}(j))) \cdot \hat{A}_m(j) \cdot \cos(\phi_{3\mathrm{rd}})$$

$$y_Q(k) = \Delta \hat{A}_Q(j) \cdot SR(k) - \Delta \hat{A}_m(j) \cdot SR(k - \hat{\delta}(j)) \cdot \sin(\phi_{3\mathrm{rd}}) +$$
$$\hat{\Delta \delta}(j) \cdot \frac{\partial}{\partial t}(SR(k - \hat{\delta}(j))) \cdot \hat{A}_m(j) \cdot \sin(\phi_{3\mathrm{rd}}).$$

The Taylor expansions can be rewritten in Matrix form for the input I and Q sampled data set as $$\begin{bmatrix} SR(x(k)) & SR(x(k)-\hat{\delta}(j-1)) & \frac{\partial}{\partial t}(SR(x(k)-\hat{\delta}(j-1))) \\ \vdots & \vdots & \vdots \\ \vdots & \vdots & \vdots \end{bmatrix} \cdot \begin{bmatrix} \Delta \hat{A}_I(j) \\ \Delta \hat{A}_m(j) \cdot \cos(\phi_{3\text{rd}}) \\ \hat{\Delta}\delta(j) \cdot \hat{A}_m(j) \cdot \cos(\phi_{3\text{rd}}) \end{bmatrix} = y_I(k) \quad (5a)$$

and $$\begin{bmatrix} SR(x(k)) & SR(x(k)-\hat{\delta}(j-1)) & \frac{\partial}{\partial t}(SR(x(k)-\hat{\delta}(j-1))) \\ \vdots & \vdots & \vdots \\ \vdots & \vdots & \vdots \end{bmatrix} \cdot \begin{bmatrix} \Delta \hat{A}_Q(j) \\ \Delta \hat{A}_m(j) \cdot \sin(\phi_{3\text{rd}}) \\ \hat{\Delta}\delta(j) \cdot \hat{A}_m(j) \cdot \sin(\phi_{3\text{rd}}) \end{bmatrix} = y_Q(k). \quad (5b)$$

Equations 5a and 5b are then solved separately. These matrix equations can be solved in a number of ways but the simplest is to use a least squares fitting process. If the matrix is over-determined, the least squares fitting process determines a pseudo-inverse matrix. The solutions to Equations 5a and 5b are the estimates of two error vectors $$\begin{bmatrix} \varepsilon_{dI} \\ \varepsilon_{mI} \\ \varepsilon_{\delta I} \end{bmatrix} = \begin{bmatrix} \Delta \hat{A}_I(j) \\ \Delta \hat{A}_m(j) \cdot \cos(\phi_{3\text{rd}}) \\ \hat{\Delta}\delta(j) \cdot \hat{A}_m(j) \cdot \cos(\phi_{3\text{rd}}) \end{bmatrix}$$

and $$\begin{bmatrix} \varepsilon_{dQ} \\ \varepsilon_{mQ} \\ \varepsilon_{\delta Q} \end{bmatrix} = \begin{bmatrix} \Delta \hat{A}_Q(j) \\ \Delta \hat{A}_m(j) \cdot \sin(\phi_{3\text{rd}}) \\ \hat{\Delta}\delta(j) \cdot \hat{A}_m(j) \cdot \sin(\phi_{3\text{rd}}) \end{bmatrix}.$$

The estimates of the transition trajectory components are updated using these error estimates according to $$\hat{A}_I(j) = \hat{A}_I(j-1) + (\kappa + \varepsilon_{dI})$$

$$\hat{A}_Q(j) = \hat{A}_Q(j-1) + (\kappa + \varepsilon_{dQ})$$

$$\hat{A}_m(j) = \hat{A}_m(j-1) + \kappa \cdot \left( \frac{\varepsilon_{mI}}{\cos(\phi_{3\text{rd}})} + \frac{\varepsilon_{mQ}}{\sin(\phi_{3\text{rd}})} \right)$$

$$\hat{\delta}(j) = \hat{\delta}(j-1) + \kappa \cdot \left( \frac{\varepsilon_{\delta I}}{\hat{A}_m(j) \cdot \cos(\phi_{3\text{rd}})} + \frac{\varepsilon_{\delta Q}}{\hat{A}_m(j) \cdot \sin(\phi_{3\text{rd}})} \right),$$

where κ is an inverse of a loop gain. Typical values of the loop gain are between 10-1000. The loop gain may vary as the second procedure converges on a solution.

Figure 13:
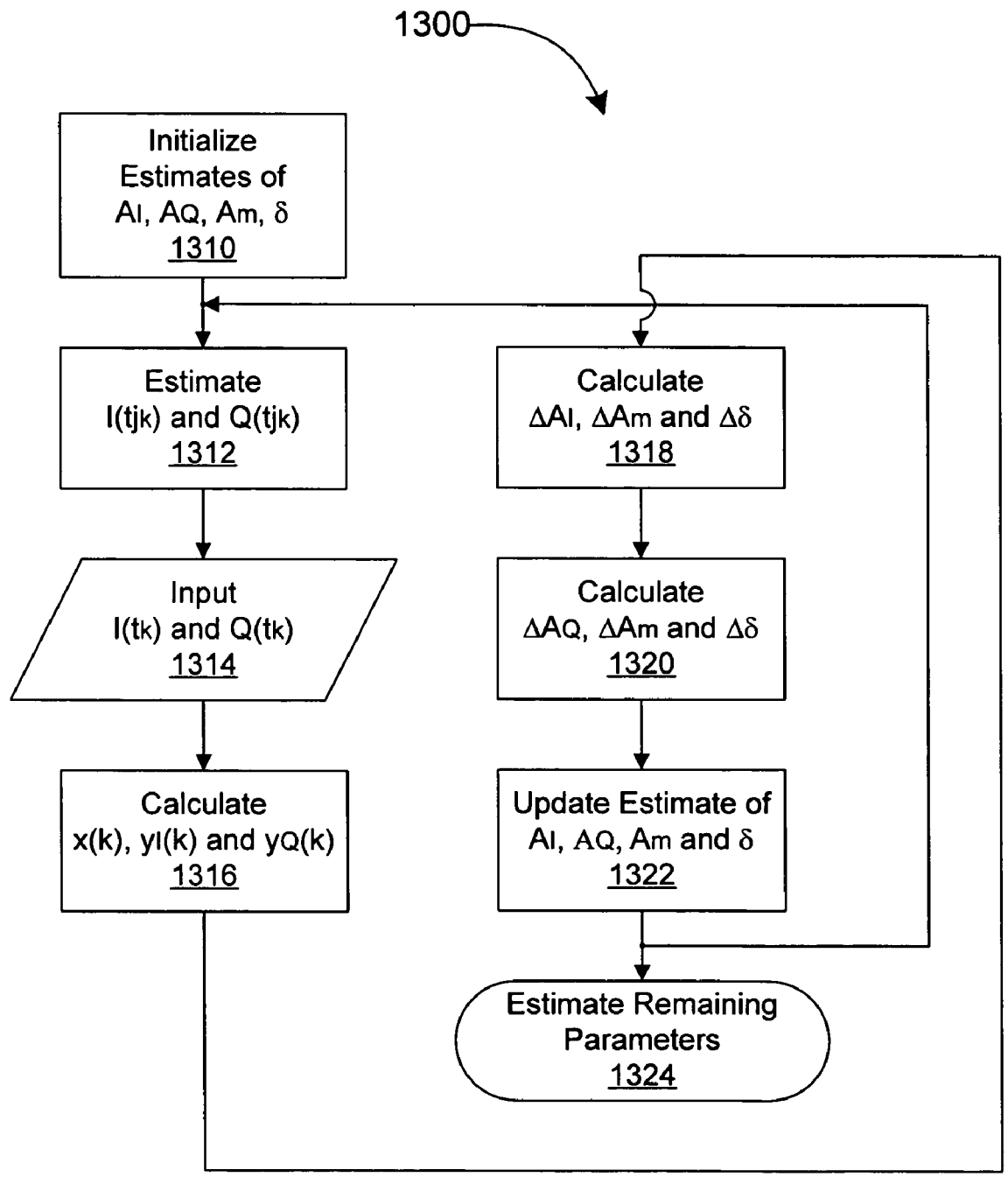
FIG. 13 is a block diagram illustrating a second procedure in the technique for determining the multi-path-induced error.

FIG. 13 is a flow chart for the second procedure 1300 in the signal analysis method. In step 1310, estimates of $A_I$, $A_Q$, the amplitude of the multi-path signal $A_m$ 216 (FIG. 2) and the time delay δ are initialized. Estimates for I(t) and Q(t) are determined 1312. The measured I(t) and Q(t) are input 1314. x and y for the I samples and y for the Q samples are calculated 1316. $\Delta A_I$, $\Delta A_m$ and $\Delta\delta$ are calculated 1318. $\Delta A_Q$, $\Delta A_m$ and $\Delta\delta$ are calculated 1320. Estimates for $A_I$, $A_Q$, the amplitude of the multi-path signal $A_m$ 216 (FIG. 2) and the time delay δ are updated 1322. The steps are then repeated until the second procedure converges 1300. A suitable convergence criterion is that a change in the estimated parameters during an iteration is smaller than $10^{-4}$. Remaining parameters are then estimated 1324.

From the quantities computed by the first procedure and the second procedure, estimates for all of the parameters that describe the transition trajectory 710 (FIG. 7) may be determined. The first procedure provides the time error Δt 520 and the phase $\phi_{3rd}$ 416_1 (FIG. 4A). Estimates for the time delay δ and the amplitude of the multi-path signal $A_m$ 216 (FIG. 2) are determined in the second procedure. Estimates for the remaining parameters may be determined from these parameters. In particular, $$\hat{A}_d = \sqrt{(\hat{A}_I)^2 + (\hat{A}_Q)^2}$$

$$\phi_\varepsilon = \tan^{-1}\left(\frac{\hat{A}_Q}{\hat{A}_I}\right)$$

$$\phi_m = \pi - (\phi_\varepsilon + \phi_{3\text{rd}}).$$

The estimate for the phase error $\phi_\varepsilon$ 412_1 (FIG. 4A) allows the multi-path-induced error associated with this parameter to be corrected in a navigation computation. The navigation computation may include determination of position, any derivatives of the position and/or combinations of the position and one or more of the derivatives of the position. Simulations of an embodiment of the signal analysis method show it to be effective at removing as much as 95% of the multi-path-induced error for path-length differences as small as 1 m.

The illustrations and exemplary embodiments of the system and method for mitigating one or more multi-path-induced errors may be used for one or more multi-path signals. If there is more than one multi-path signal present, the estimated parameters will correspond to a vector sum of the multi-path signals. The system and method may also be used for a plurality of receiver or satellite filters if filter characteristics for these filters are known. If the filters have sufficiently similar filter characteristics, in some embodiments a mean filter characteristic may be used to implement the system and method.

While the system and method described above are also useful in mitigating one or more multi-path-induced errors for path-length differences larger than 50 feet, there are some additional challenges associated with such multi-path signals. In particular, such multi-path signals have a shorter correlation time. It those embodiments that use a lower sampling rate and integrate over time to obtain a sufficient signalto-noise ratio, this may be problematic. In those embodiments, the system and method may be used in conjunction with other multi-path-induced error mitigation techniques, such as a double-delta correction, a strobed correlator and a pulse-aperture correlator. The double-delta correction technique, and other multi-path-induced error mitigation techniques, are well suited for use in conjunction with this system and method. In particular, the system and method described above mitigate phase errors associated with multi-path signals that are not removed by these other multi-path-induced error mitigation techniques and also estimate the residual multi-path induced pseudo-range errors. In addition, these other multi-path-induced error mitigation techniques and the system and method described above do not interfere with one another.

The system and method may be applied to mitigating multi-path-induced errors in the timing of the receiver reconstruction of the CA code, such as a pseudo-range error. In particular, the time error $\Delta t$ 520 (FIG. 5) may be determined without determining the phase error $\phi_\epsilon$ 412_1 (FIG. 4A) by only implementing the first procedure in the signal analysis method. In such embodiments, a suitable filter bandwidth is some 10 MHz and the filter step response time should be substantially less than 1 µs, the period of the CA code.

The system and method for mitigating phase errors associated with short-range multi-path signals may be implemented in a number of configurations. The dividing line between analog processing, digital hardware and software signal processing is arbitrary, and varies greatly from receiver to receiver. Often a large portion of the signal processing in receivers is implemented in an ASIC. Other configurations use a combination of an ASIC and software executed by one or more processors. The trend has been to implement more and more of the receiver in software. Some receivers, including those that are non-real time, have been implemented entirely in software. In addition, some receivers have implemented all the signal processing with analog circuitry.

In some embodiments of the system, steps performed on a time scale of 33 ns (30 MHz) or less are implemented using analog circuitry. Steps performed on time scales between 33 ns and 1 ms are implemented using an ASIC. Remaining steps, such as integrations in accumulators, on longer time scales are implemented using software executed by one or more processors, such as a microprocessor.

Figure 11:
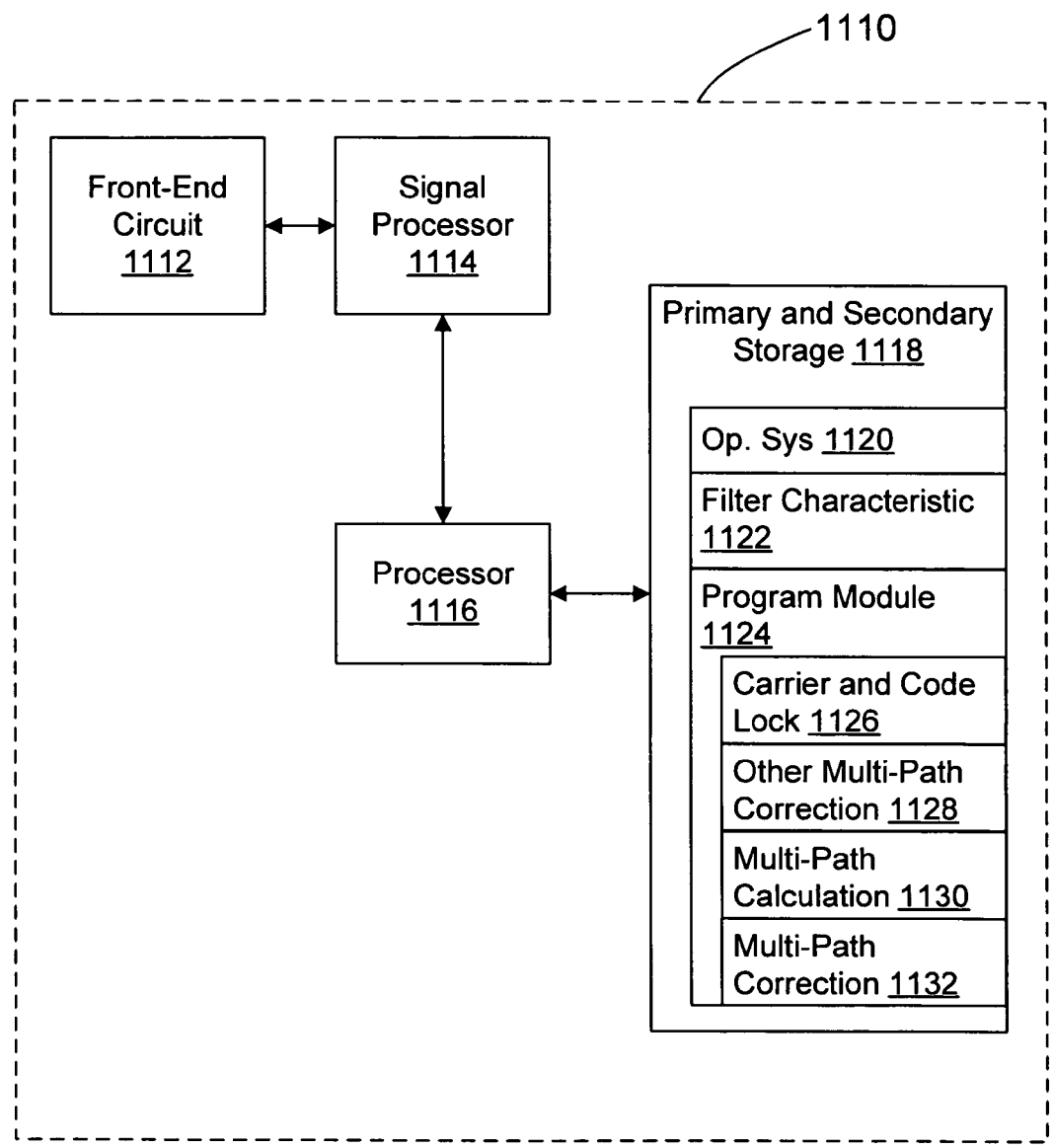
FIG. 11 is a block diagram illustrating the components of the typical device for use in the global navigation satellite system (GNSS).

FIG. 11 illustrates an embodiment of a device 1110 in the global navigation satellite system (GNSS) for mitigating one or more multi-path-induced errors. The device 1110 includes:
 a front-end circuit 1112, such as front-end circuit 800 (FIG. 8);
 a signal processor 1114, such as signal processor 900 (FIG. 9);
 processor 1116;
 storage 1118, which may include high-speed random access memory and may also include non-volatile memory, such as one or more magnetic disk storage devices, EEPROM and/or Flash EEPROM, the storage further including:
  an operating system 1120;
  one or more filter characteristics 1122; and
  and at least one program module 1124, executed by processor 1116, the at least one program module 1124 including instructions for carrier and code lock 1126, an optional other multi-path correction 1128 (such as the double-delta correction, the strobed correlator and the pulse-aperture correlator), a multi-path calculation 1130, including the first procedure and the second procedure described previously, and a multi-path correction 1132 of the phase error $\phi_\epsilon$ 412_1 (FIG. 4A) or the pseudo-range.

In some embodiments there may be more than one processor 1116. As noted previously, in other embodiments, the device 1110 may include an ASIC and some or all of the functionality of the at least one program module 1124, executed by the processor 1116, may be implemented in the ASIC.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A method of mitigating the effect of a multi-path-induced error in a global navigation satellite system (GNSS), comprising:
 receiving a composite signal, including a band-limited direct-path signal and at least one band-limited multi-path signal, wherein the direct-path signal and the multi-path signal are modulated with periodic phase reversals;
 measuring the composite signal as a function of time during a time interval having at least one of the periodic phase reversals;
 determining a phase error $\phi_\epsilon$ between the composite signal and the direct-path signal due to the multi-path signal in accordance with the measured composite signal as a function of time and a pre-determined filter characteristic of one or more filters in the GNSS that are used to band limit the direct-path signal and the multi-path signal;
 wherein the determining is responsive to phase errors corresponding to time delays of the multi-path signal relative to the direct-path signal that are shorter than a filter step response time of the one or more filters used to band limit the direct-path signal and the multi-path signal; and
 correcting for the phase error $\phi_\epsilon$.

2. The method of claim 1, further comprising determining a time error $\Delta t$, the time error $\Delta t$ corresponding to a difference between an actual phase reversal time including the effect of the multi-path signal and a phase reversal time without the effect of the multi-path signal, and correcting an error in a pseudo-range corresponding to the time error $\Delta t$.

3. The method of claim 1, wherein measuring the composite signal further comprises measuring in-phase I and quadrature Q components of the composite signal.

4. The method of claim 1, wherein the direct-path signal and the multi-path signal include a Global Positioning System L-band carrier signal.

5. The method of claim 1, wherein the direct-path signal and the multi-path signal are encoded using a spread-spectrum pseudo-random-noise code.

6. The method of claim 1, wherein the global navigation satellite system (GNSS) is selected from the group consisting of a Global Positioning System (GPS), a Global Orbiting Navigation Satellite System (GLONASS), a GALILEO positioning system, a European Geostationary Navigation Overlay System (EGNOS), a Wide Area Augmentation System (WAAS), a Multifunctional Transport Satellite-Based Augmentation System (MSAS) and a Quasi-Zenith Satellite System (QZSS).

7. The method of claim 1, wherein the filter step response time of the one or more filters is less than or equal to 200 ns.

8. The method of claim 1, wherein the filter step response time of the one or more filters is less than or equal to 1 µs.

9. The method of claim 1, wherein the filter step response time of the one or more filters is between 40 ns and 200 ns.

10. The method of claim 1, further comprising mitigating a multi-path-induced error using a technique selected from the group consisting of a double-delta correction, a strobed correlator and a pulse-aperture correlator.

11. The method of claim 1, further comprising determining an amplitude of the direct-path signal, an amplitude of the multi-path signal, a phase difference $\phi_m$ between the direct-path signal and the multi-path signal, and a time delay $\delta$ of the multi-path signal relative to the direct-path signal in accordance with a filter step response, a measured amplitude of the composite signal and the measured composite signal as a function of time.

12. The method of claim 1, further comprising determining a phase difference $\phi_m$ between the direct-path signal and the multi-path signal in accordance with a filter step response, a measured amplitude of the composite signal and the measured composite signal as a function of time.

13. The method of claim 1, wherein a first procedure determines a first set of parameters including a time error $\Delta t$, the time error $\Delta t$ corresponding to a difference between an actual phase reversal time including the effect of the multi-path signal and a phase reversal time without the effect of the multi-path signal, and a phase $\phi_{3rd}$ equal to 180° minus the sum of the phase error $\phi_\epsilon$ and a phase difference $\phi_m$ between the direct-path signal and the multi-path signal.

14. The method of claim 13, wherein the first set of parameters are determined using a least-squares fitting process.

15. The method of claim 13, wherein a second procedure determines a second set of parameters including an amplitude of the direct-path signal, an amplitude of the multi-path signal, and the phase error $\phi_\epsilon$, from which the phase difference $\phi_m$ can be determined using the phase $\phi_{3rd}$.

16. The method of claim 15, wherein the second set of parameters are determined from a least-squares fitting process.

17. A device that mitigates the effect of a multi-path-induced error in a global navigation satellite system (GNSS), comprising:
a receiver that receives a composite signal, including a band-limited direct-path signal and at least one band-limited multi-path signal, wherein the direct-path signal and the multi-path signal are modulated with periodic phase reversals;
a measurement mechanism that samples the composite signal as a function of time during a time interval having at least one of the periodic phase reversals;
a processor;
a memory including at least one program module that is executed by the processor, the at least one program module containing instructions for determining a phase error $\phi^\epsilon$ between the composite signal and the direct-path signal due to the multi-path signal in accordance with the measured composite signal as a function of time and a pre-determined filter characteristic of one or more filters in the GNSS that are used to band limit the direct-path signal and the multi-path signal;
wherein the determining is responsive to phase errors corresponding to time delays of the multi-path signal relative to the direct-path signal that are shorter than a filter step response time of the one or more filters used to band limit the direct-path signal and the multi-path signal; and
wherein the device is configured to correct for the phase error $\phi_\epsilon$.

18. The device of claim 17, wherein the measurement mechanism samples the composite signal while the device is synchronized with a carrier signal and a code signal.

19. The device of claim 17, the at least one program module further containing instructions for determining a time error $\Delta t$, the time error $\Delta t$ corresponding to a difference between an actual phase reversal time including the effect of the multi-path signal and a phase reversal time without the effect of the multi-path signal, and correcting an error in a pseudo-range corresponding to the time error $\Delta t$.

20. The device of claim 17, wherein the measurement mechanism measures in-phase I and quadrature Q components of the composite signal.

21. The device of claim 17, wherein the direct-path signal and the multi-path signal include a Global Positioning System L-band carrier signal.

22. The device of claim 17, wherein the code comprises a spread-spectrum pseudo-random-noise code.

23. The device of claim 17, wherein the global navigation satellite system (GNSS) is selected from the group consisting of a Global Positioning System (GPS), a Global Orbiting Navigation Satellite System (GLONASS), a GALILEO positioning system, a European Geostationary Navigation Overlay System (EGNOS), a Wide Area Augmentation System (WAAS), a Multifunctional Transport Satellite-Based Augmentation System (MSAS) and a Quasi-Zenith Satellite System (QZSS).

24. The device of claim 19, wherein the filter step response time of the one or more filters is less than or equal to 200 ns.

25. The device of claim 19, wherein the filter step response time of the one or more filters r is less than or equal to 1 µs.

26. The device of claim 19, wherein the filter step response time of the one or more filters is between 40 and 200 ns.

27. The device of claim 17, the at least one program module further containing instructions for mitigating a multi-path-induced error using a technique selected from the group consisting of a double-delta correction, a strobed correlator and a pulse-aperture correlator.

28. The device of claim 17, the at least one program module further containing instructions for determining an amplitude of the direct-path signal, an amplitude of the multi-path signal, a phase difference $\phi_m$ between the direct-path signal and the multi-path signal, and a time delay $\delta$ of the multi-path signal relative to the direct-path signal in accordance with a filter step response of the one or more filters, a measured amplitude of the composite signal and the measured composite signal as a function of time.

29. The device of claim 17, the at least one program module further containing instructions for determining a phase difference $\phi_m$ between the direct-path signal and the multi-path signal in accordance with a filter step response, a measured amplitude of the composite signal and the measured composite signal as a function of time.

30. The device of claim 17, the at least one program module further containing instructions for a first procedure that determines a first set of parameters including a time error $\Delta t$, the time error $\Delta t$ corresponding to a difference between an actual phase reversal time including the effect of the multi-path signal and a phase reversal time without the effect of the multi-path signal, and a phase $\phi_{3rd}$ equal to 180° minus the sum of the phase error $\phi_\epsilon$ and the phase difference $\phi_m$ between the direct-path signal and the multi-path signal.

31. The device of claim 30, wherein the first set of parameters are determined using a least-squares fitting process.

32. The device of claim 30, wherein the at least one program module further containing instructions for a second procedure that determines a second set of parameters including an amplitude of the direct-path signal, an amplitude of the multi-path signal and the phase error $\phi_\epsilon$, from which the phase difference $\phi_m$ can be determined using the phase $\phi_{3rd}$.

33. The device of claim 32, wherein the second set of parameters are determined from a least-squares fitting process.

34. A device that mitigates the effect of a multi-path-induced error in a global navigation satellite system (GNSS), comprising:
   a receiving means that receives a composite signal, including a band-limited direct-path signal and at least one band-limited multi-path signal, wherein the direct-path signal and the multi-path signal are modulated with periodic phase reversals;
   a measurement means that samples the in-phase I and quadrature Q components of the composite signal as a function of time during a time interval having at least one of the periodic phase reversals;
   a processor means;
   a memory means including at least one program module that is executed by the processor, the at least one program module containing instructions for:
      determining an amplitude of the direct-path signal;
      determining an amplitude of the multi-path signal;
      determining a phase difference $\phi_m$ between the direct-path signal and the multi-path signal;
      determining a time delay $\delta$ of the multi-path signal relative to the direct-path signal; and
   determining the phase error $\phi_\epsilon$ between the composite signal and the direct-path signal due to the multi-path signal,
      wherein the determining operations are in accordance with a pre-determined filter step response of one or more filters in the GNSS used to band limit the direct-path signal and the multi-path signal, a measured amplitude of the composite signal and the measured in-phase I and quadrature Q components of the composite signal as a function of time, wherein the determining is responsive to phase errors corresponding to time delays of the multi-path signal relative to the direct-path signal that are shorter than the filter step response time of the one or more filters, and wherein the device is configured to correct for the phase error $\phi_\epsilon$.

35. The device of claim 34, wherein the global navigation satellite system (GNSS) is selected from the group consisting of a Global Positioning System (GPS), a Global Orbiting Navigation Satellite System (GLONASS), a GALILEO positioning system, a European Geostationary Navigation Overlay System (EGNOS), a Wide Area Augmentation System (WAAS), a Multifunctional Transport Satellite-Based Augmentation System (MSAS) and a Quasi-Zenith Satellite System (QZSS).

36. A method of mitigating the effect of a multi-path-induced error in a global navigation satellite system (GNSS), comprising:
   receiving a composite signal, including a band-limited direct-path signal and at least one band-limited multi-path signal, wherein the direct-path signal and the multi-path signal are modulated with periodic phase reversals;
   measuring the composite signal as a function of time during a time interval having at least one of the periodic phase reversals;
   determining a time error $\Delta t$, the time error $\Delta t$ corresponding to a difference between an actual phase reversal time including the effect of the multi-path signal and a phase reversal time without the effect of the multi-path signal, in accordance with the measured composite signal as a function of time and a pre-determined filter characteristic of one or more filters in the GNSS used to band limit the direct-path signal and the multi-path signal;
   wherein the determining is responsive to phase errors corresponding to time delays of the multi-path signal relative to the direct-path signal that are shorter than a filter step response time of the one or more filters used to band limit the direct-path signal and the multi-path signal; and
   correcting for an error in a pseudo-range corresponding to the time error $\Delta t$.

37. The method of claim 36, wherein measuring the composite signal further comprises measuring in-phase I and quadrature Q components of the composite signal.

38. The method of claim 36, wherein the direct-path signal and the multi-path signal include a Global Positioning System L-band carrier signal.

39. The method of claim 36, wherein a first procedure determines a first set of parameters including the time error $\Delta t$ and a phase $\phi_{3rd}$ equal to 180° minus the sum of a phase error $\phi_\epsilon$ between the composite signal and the direct-path signal due to the multi-path signal and a phase difference $\phi_m$ between the direct-path signal and the multi-path signal.

40. The method of claim 39, wherein the first set of parameters are determined using a least-squares fitting process.

41. A device that mitigates the effect of a multi-path-induced error in a global navigation satellite system (GNSS), comprising:
   a receiver that receives a composite signal, including a band-limited direct-path signal and at least one band-limited multi-path signal, wherein the direct-path signal and the multi-path signal are modulated with periodic phase reversals;
   a measurement mechanism that samples the composite signal as a function of time during a time interval having at least one of the periodic phase reversals;
   a processor;
   memory including at least one program module that is executed by the processor, the at least one program module containing instructions for determining a time error $\Delta t$, the time error $\Delta t$ corresponding to a difference between an actual phase reversal time including the effect of the multi-path signal and a phase reversal time without the effect of the multi-path signal, in accordance with the measured composite signal as a function of time and a pre-determined filter characteristic of one or more filters in the GNSS used to band limit the direct-path signal and the multi-path signal;
   wherein the determining is responsive to phase errors corresponding to time delays of the multi-path signal relative to the direct-path signal that are
   shorter than a filter step response time of the one or more filters used to band limit the direct-path signal and the multi-path signal; and
   wherein the device is configured to correct for in an error corresponding to the time error $\Delta t$ in a pseudo-range.

42. The device of claim 41, wherein the measurement mechanism samples the composite signal while the device is synchronized with a carrier signal and a code signal.

43. The device of claim 41, wherein the measurement mechanism measures in phase I and quadrature Q components of the composite signal.

44. The device of claim 41, wherein the direct-path signal and the multi-path signal include a Global Positioning System L-band carrier signal.

45. The device of claim 41, the at least one program module further containing instructions for a first procedure that determines a first set of parameters including the time error $\Delta t$ and a phase $\phi_{3rd}$ equal to 180° minus the sum of the phase error $\phi_\epsilon$ between the composite signal and the direct-path signal due to the multi-path signal and the phase difference $\phi_m$ between the direct-path signal and the multi-path signal.

46. The device of claim 45, wherein the first set of parameters are determined using a least-squares fitting process.

47. A device that mitigates the effect of a multi-path-induced error in a global navigation satellite system (GNSS), comprising:
- a receiving means that receives a composite signal, including a band-limited direct-path signal and at least one band-limited multi-path signal, wherein the direct-path signal and the multi-path signal are modulated with periodic phase reversals;
- a measurement means that samples the in-phase I and quadrature Q components of the composite signal as a function of time during a time interval having at least one of the periodic phase reversals;
- a processor means;
- a memory means including at least one program module that is executed by the processor, the at least one program module containing instructions for:
  determining a time error $\Delta t$, the time error $\Delta t$ corresponding to a difference between an actual phase reversal time including the effect of the multi-path signal and a phase reversal time without the effect of the multi-path signal;
  wherein the determining operation is in accordance with a pre-determined filter step response corresponding to one or more filters in the GNSS that are used to band limit the direct-path signal and the multi-path signal, a measured amplitude of the composite signal and the measured in-phase I and quadrature Q components of the composite signal as a function of time, wherein the determining is responsive to phase errors corresponding to time delays of the multi-path signal relative to the direct-path signal that are shorter than the filter step response time of the one or more filters, and wherein the device is configured to correct for an error corresponding to the time error $\Delta t$ in a pseudo-range.

48. The device of claim 47, wherein the global navigation satellite system (GNSS) is selected from the group consisting of a Global Positioning System (GPS), a Global Orbiting Navigation Satellite System (GLONASS), a GALILEO positioning system, a European Geostationary Navigation Overlay System (EGNOS), a Wide Area Augmentation System (WAAS), a Multifunctional Transport Satellite-Based Augmentation System (MSAS) and a Quasi-Zenith Satellite System (QZSS).

* * * * *